US012611782B2

(12) United States Patent
Suchanek et al.

(10) Patent No.: US 12,611,782 B2
(45) Date of Patent: Apr. 28, 2026

(54) ROBOTIC GROUTER

(71) Applicant: Fabrica Robotics Pte. Ltd., Singapore (SG)

(72) Inventors: Jakub Suchanek, Pruhonice (CZ); Ronald Luc, Brno (CZ); Keefe Wayne Teo Zhi Yuan, Singapore (SG)

(73) Assignee: Fabrica Robotics Pte. Ltd., Singapore (SG)

( * ) Notice: Subject to any disclaimer, the term of this patent is extended or adjusted under 35 U.S.C. 154(b) by 113 days.

(21) Appl. No.: 18/845,611

(22) PCT Filed: Mar. 3, 2023

(86) PCT No.: PCT/SG2023/050128
§ 371 (c)(1),
(2) Date: Sep. 10, 2024

(87) PCT Pub. No.: WO2023/172193
PCT Pub. Date: Sep. 14, 2023

(65) Prior Publication Data
US 2025/0196364 A1 Jun. 19, 2025

(30) Foreign Application Priority Data
Mar. 10, 2022 (SG) ........................... 10202202458V

(51) Int. Cl.
*G06F 17/00* (2019.01)
*B25J 11/00* (2006.01)
(Continued)

(52) U.S. Cl.
CPC ......... *B25J 11/005* (2013.01); *B25J 15/0019* (2013.01); *B25J 19/0058* (2013.01); *B25J 19/021* (2013.01)

(58) Field of Classification Search
CPC .. B25J 11/005; B25J 15/0019; B25J 19/0058; B25J 19/021; B25J 9/1679; B25J 11/00
(Continued)

(56) References Cited

U.S. PATENT DOCUMENTS

| | | | | |
|---|---|---|---|---|
| 4,865,782 A | * | 9/1989 | Paul ...................... | E01C 23/098 |
| | | | | 264/37.19 |
| 9,074,381 B1 | * | 7/2015 | Drew .................. | E04F 21/1872 |

(Continued)

FOREIGN PATENT DOCUMENTS

| | | | | |
|---|---|---|---|---|
| CN | 107029939 A | * | 8/2017 | ............... B05D 1/26 |
| CN | 107260074 A | | 10/2017 | |

(Continued)

OTHER PUBLICATIONS

Automatic grouting robot (Year: 2025).*
(Continued)

*Primary Examiner* — Ronnie M Mancho
(74) *Attorney, Agent, or Firm* — Blank Rome LLP

(57) ABSTRACT

An autonomous grouting robotic apparatus comprising a sponge belt, a front sponge guide assembly, a grout extruder with a nozzle, cameras, and a LIDAR is configured to map a room and identify grouting lines each corresponding to a gap between tiles and to drive the robot and control extrusion of the grout from the nozzle and to clean excess grout off tiles. The front sponge guide assembly and grout extruder are mounted to the robotic apparatus using a pivoting mounting arrangement to control a tilt angle to allow extruding into grouting gaps located along the edges of the room.

20 Claims, 26 Drawing Sheets

(51) Int. Cl.
B25J 15/00 (2006.01)
B25J 19/00 (2006.01)
B25J 19/02 (2006.01)

(58) Field of Classification Search
USPC .......................................................... 700/245
See application file for complete search history.

(56) References Cited

U.S. PATENT DOCUMENTS

| | | | | |
|---|---|---|---|---|
| 9,358,688 | B2 * | 6/2016 | Drew ..................... | B25J 9/0018 |
| 10,012,996 | B1 | 7/2018 | Canoso | |
| 10,486,330 | B2 * | 11/2019 | Giles ......................... | B28B 3/20 |
| 10,688,683 | B2 * | 6/2020 | Giles ........................ | E04G 11/20 |
| 11,331,796 | B2 * | 5/2022 | Duffy ........................ | E01H 1/00 |
| 11,673,156 | B2 * | 6/2023 | Hargadon ............. | B05B 12/124 |
| | | | | 427/424 |
| 12,478,236 | B2 * | 11/2025 | Kumar .................. | A47L 9/0488 |
| 2006/0180647 | A1 * | 8/2006 | Hansen ................... | G07F 17/20 |
| | | | | 235/375 |
| 2009/0294489 | A1 * | 12/2009 | Keohan .............. | E04F 21/1652 |
| | | | | 401/137 |
| 2015/0336272 | A1 * | 11/2015 | Drew ................. | E04F 21/1872 |
| | | | | 414/737 |
| 2015/0342336 | A1 * | 12/2015 | Martin ................... | A46B 11/06 |
| | | | | 401/275 |
| 2019/0255551 | A1 * | 8/2019 | Hargadon .............. | B25J 9/1664 |
| 2020/0004266 | A1 * | 1/2020 | Eoh ....................... | G05D 1/0248 |
| 2020/0300639 | A1 * | 9/2020 | Salfity ....................... | G06T 7/11 |
| 2020/0329937 | A1 * | 10/2020 | Sheikh ............... | A47L 11/4066 |
| 2021/0107177 | A1 * | 4/2021 | Giles ........................ | E04B 1/35 |
| 2025/0196364 | A1 * | 6/2025 | Suchanek ............. | B25J 9/1679 |

FOREIGN PATENT DOCUMENTS

| | | | | |
|---|---|---|---|---|
| CN | 109124506 | A | 1/2019 | |
| CN | 110388031 | A | 10/2019 | |
| CN | 112975979 | A | 6/2021 | |
| WO | WO-2025075550 | A1 * | 4/2025 | ........... E04F 21/165 |
| WO | WO-2025234938 | A1 * | 11/2025 | .............. B08B 5/04 |

OTHER PUBLICATIONS

International Search Report dated Sep. 21, 2023; International Application No. PCT/SG2023/050128; International Filing Date: Mar. 3, 2023; 5 pages.
Written Opinion dated Sep. 21, 2023; International Application No. PCT/SG2023/050128; International Filing Date: Mar. 3, 2023; 7 pages.

* cited by examiner

Figure 1D Side View

Isometric View

Figure 1B Front View

Figure 1C Top View

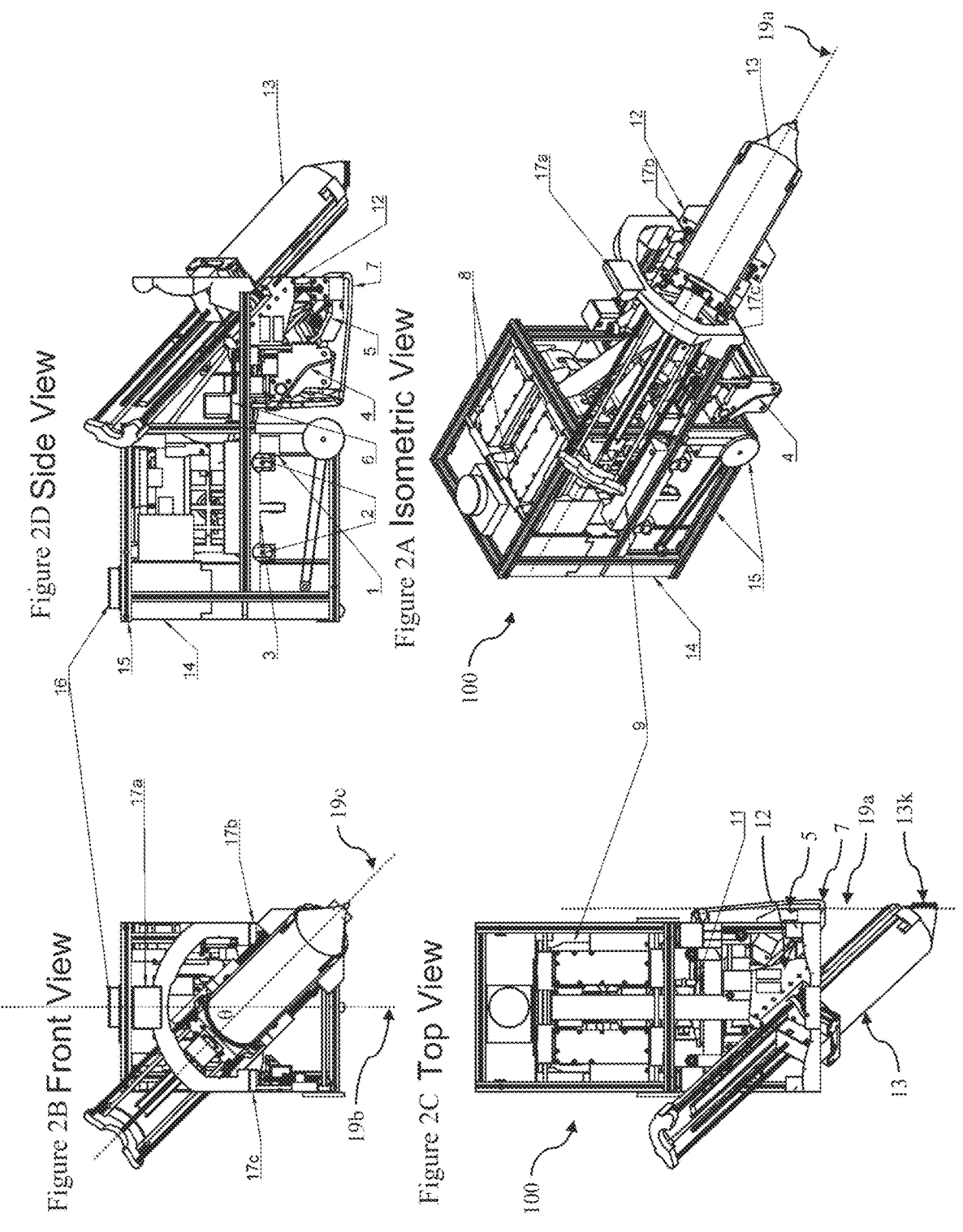
Figure 2D Side View
Figure 2A Isometric View
Figure 2B Front View
Figure 2C Top View

Figure 3D Side View

Isometric View

Figure 3B  Front View

Figure 3C Top View

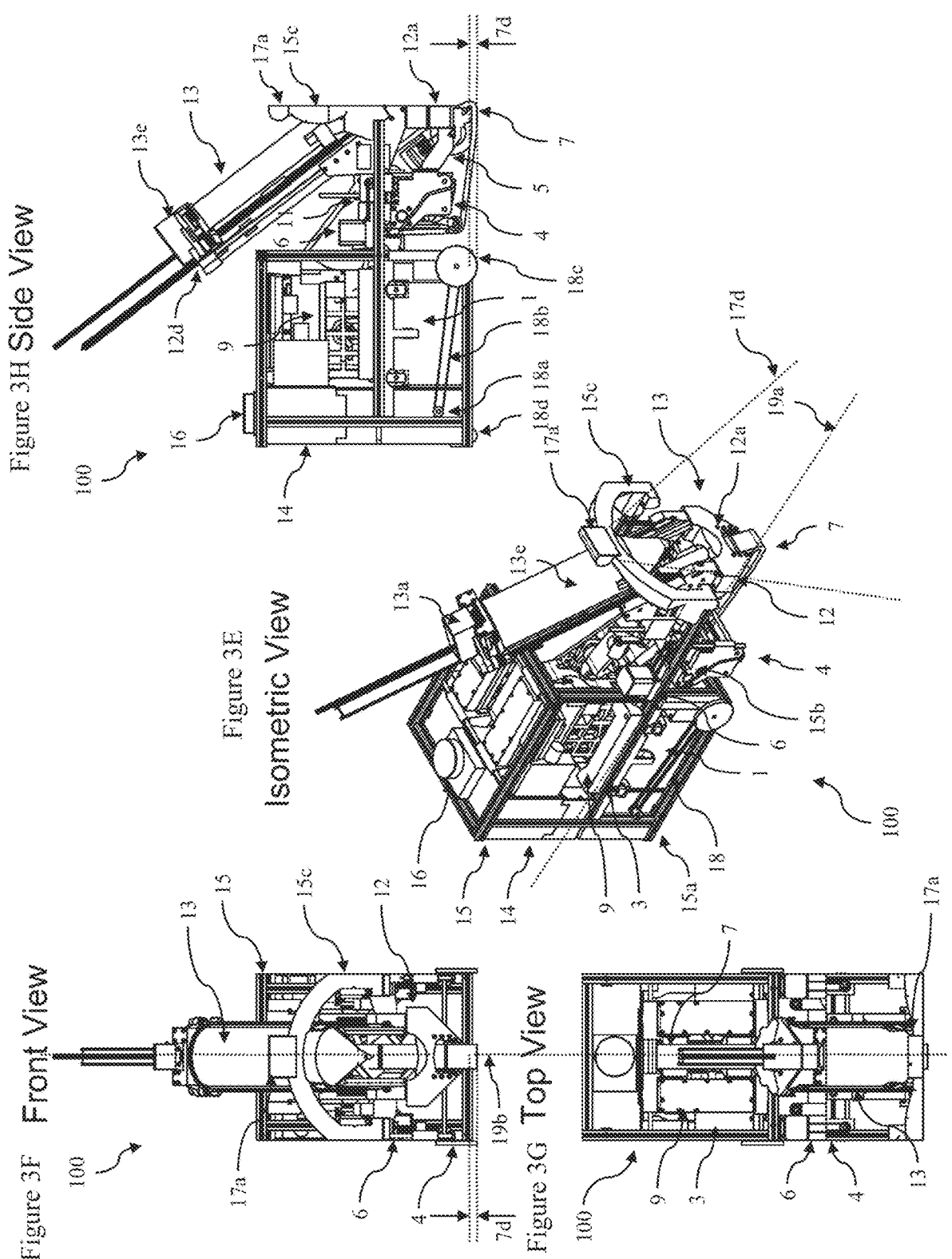
Figure 3H Side View
Figure 3E Isometric View
Figure 3F Front View
Figure 3G Top View

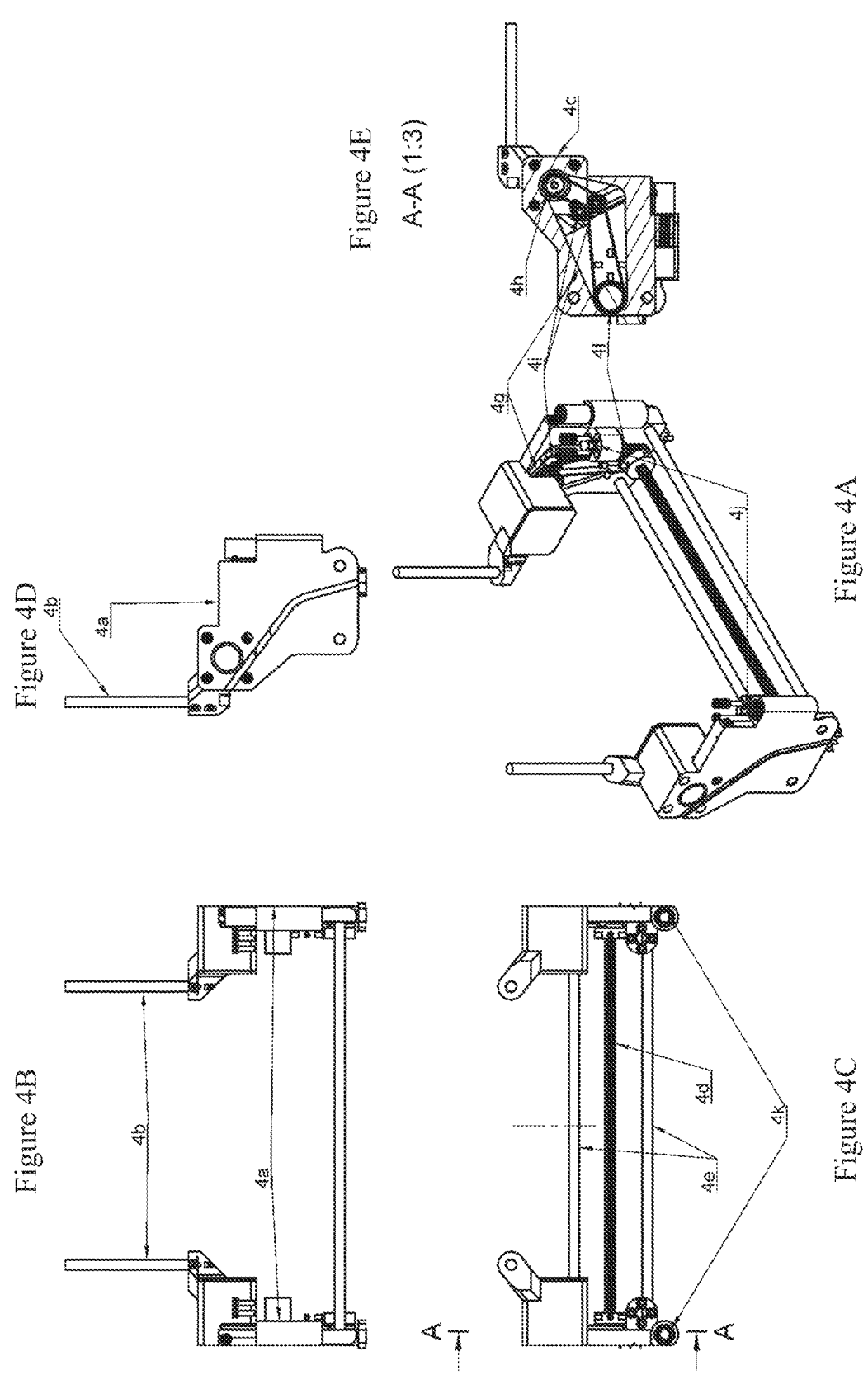

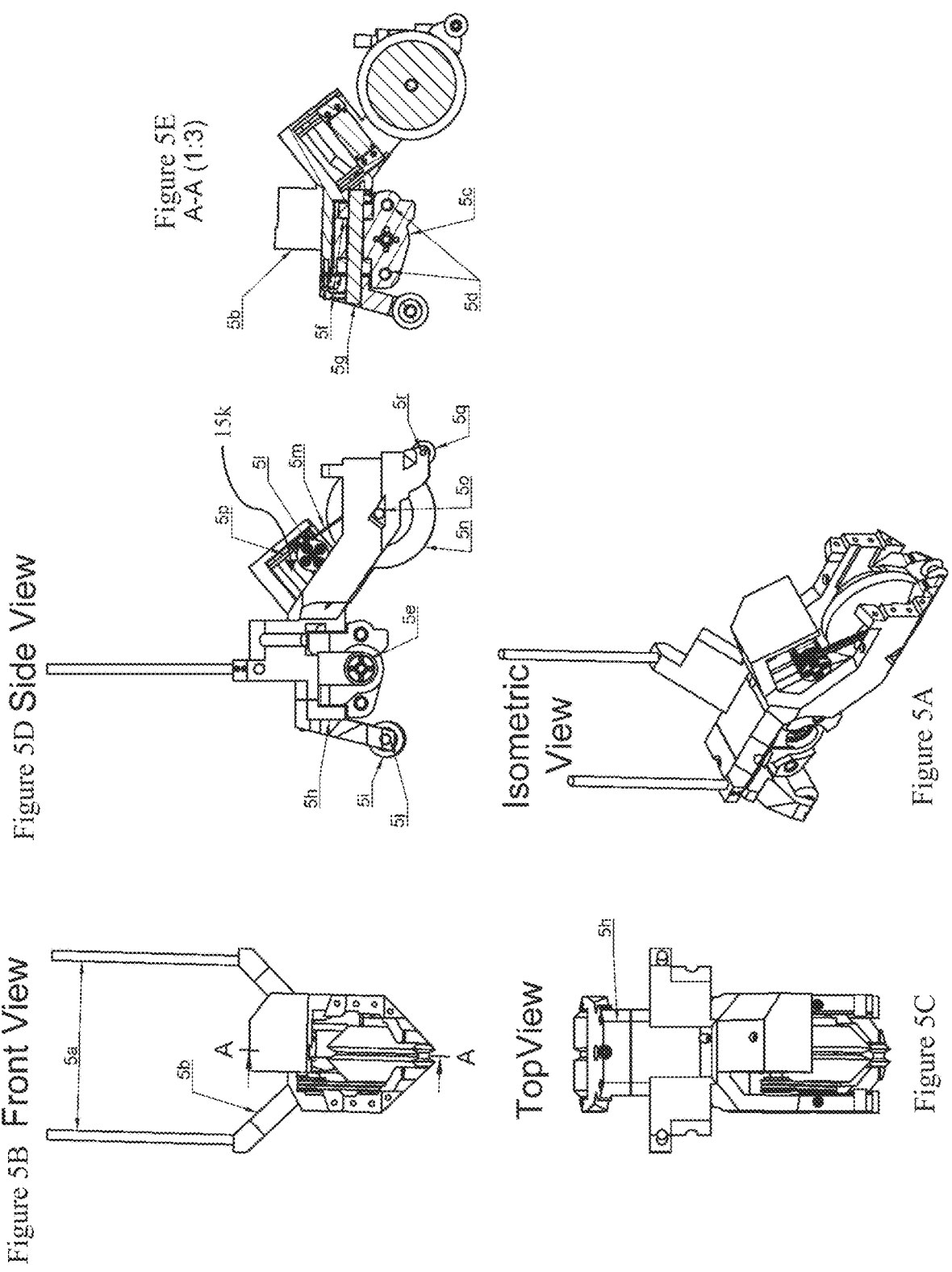

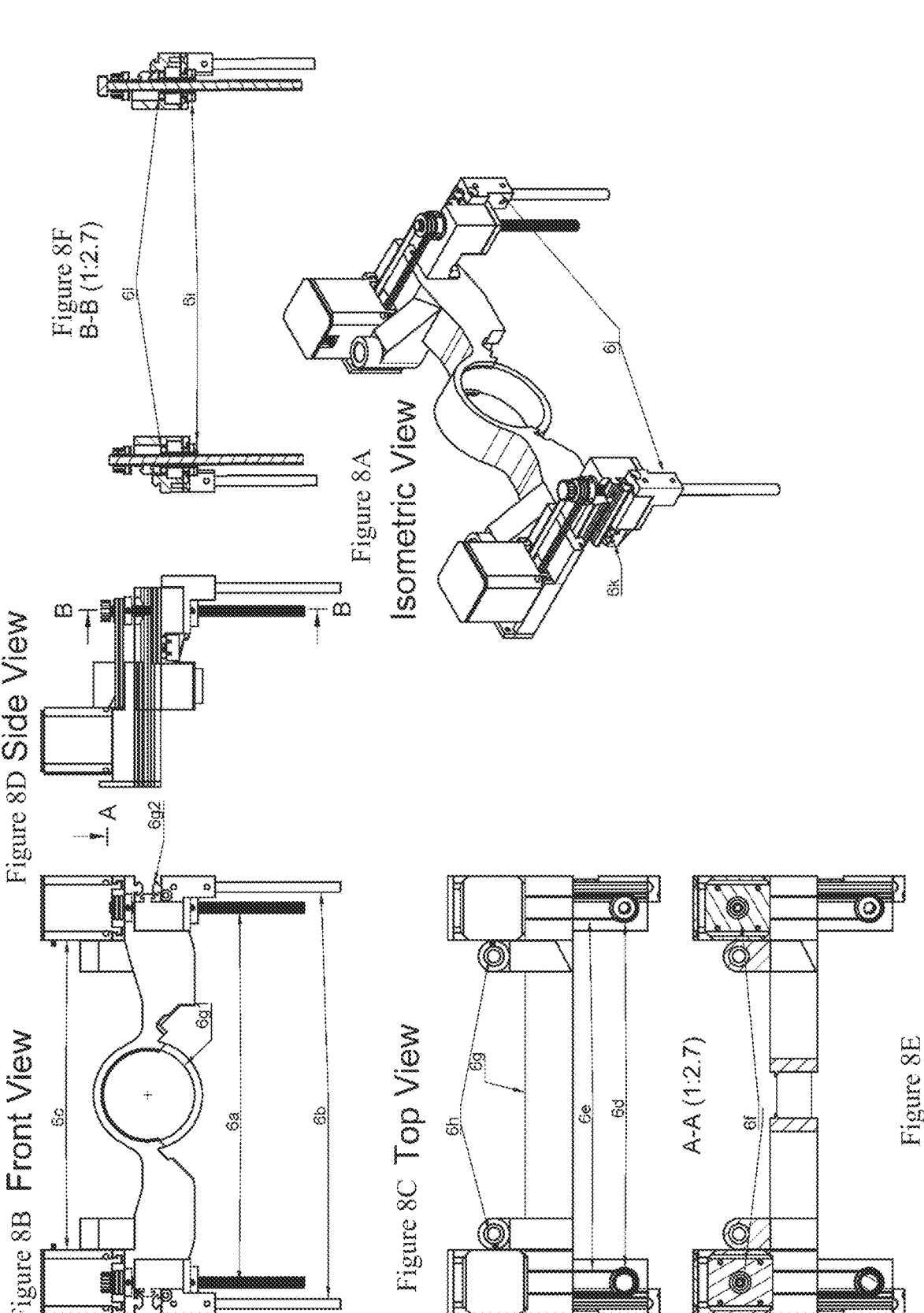

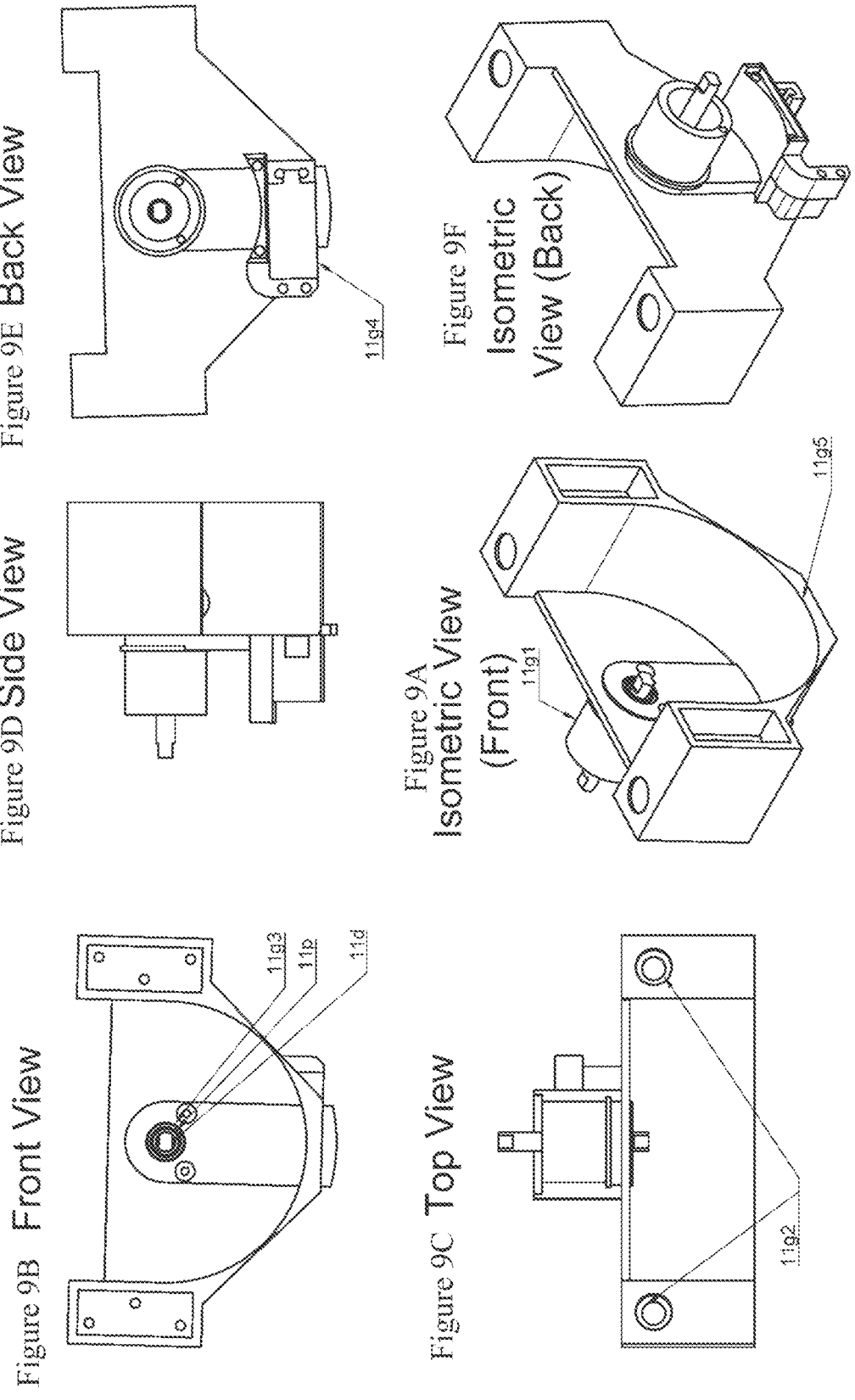
Figure 9E Back View
Figure 9F Isometric View (Back)
Figure 9D Side View
Figure 9A Isometric View (Front)
Figure 9B Front View
Figure 9C Top View

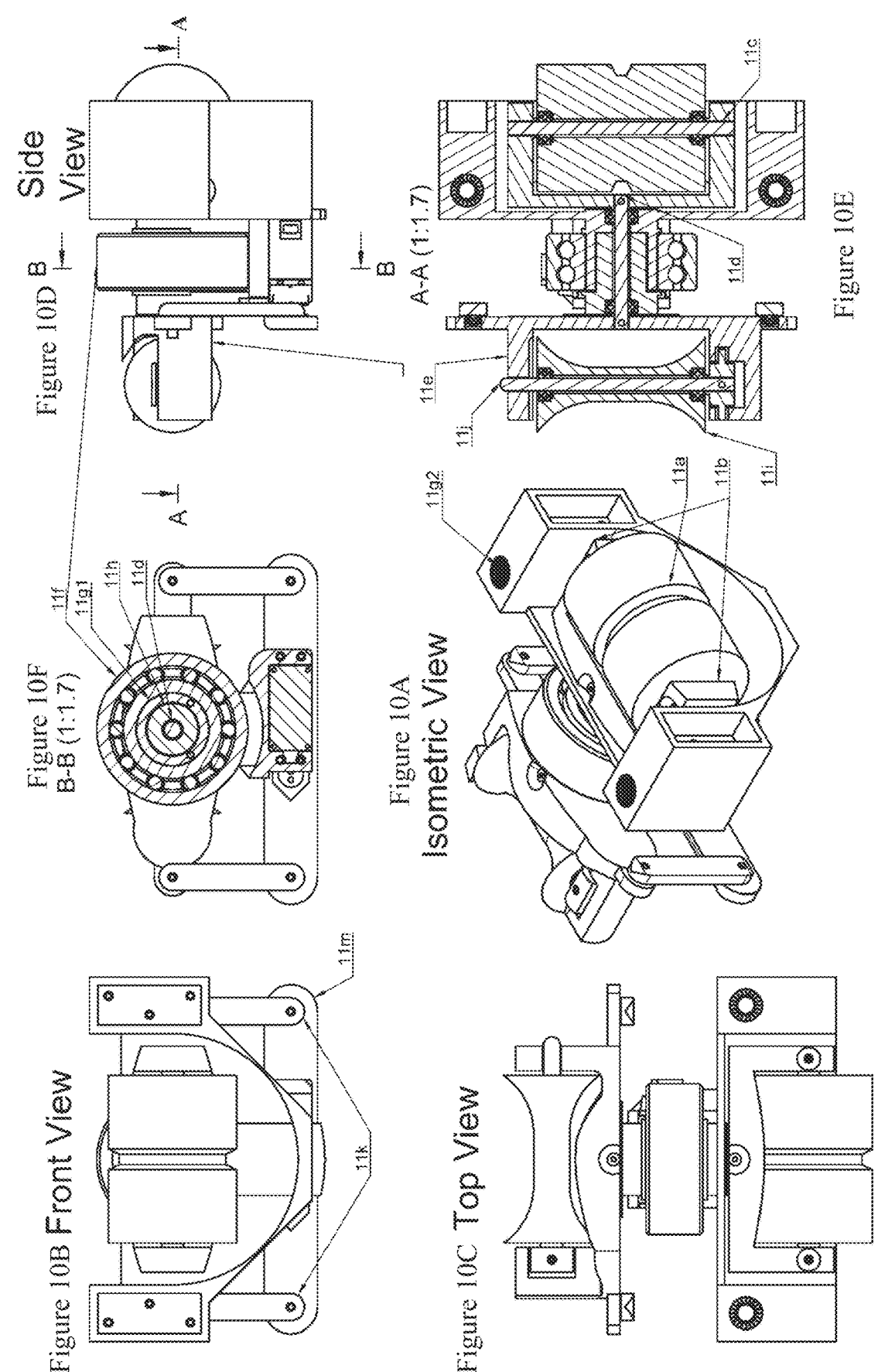
Figure 10D Side View
Figure 10E A-A (1:1.7)
Figure 10F B-B (1:1.7)
Figure 10A Isometric View
Figure 10B Front View
Figure 10C Top View

A-A (1:1.27)

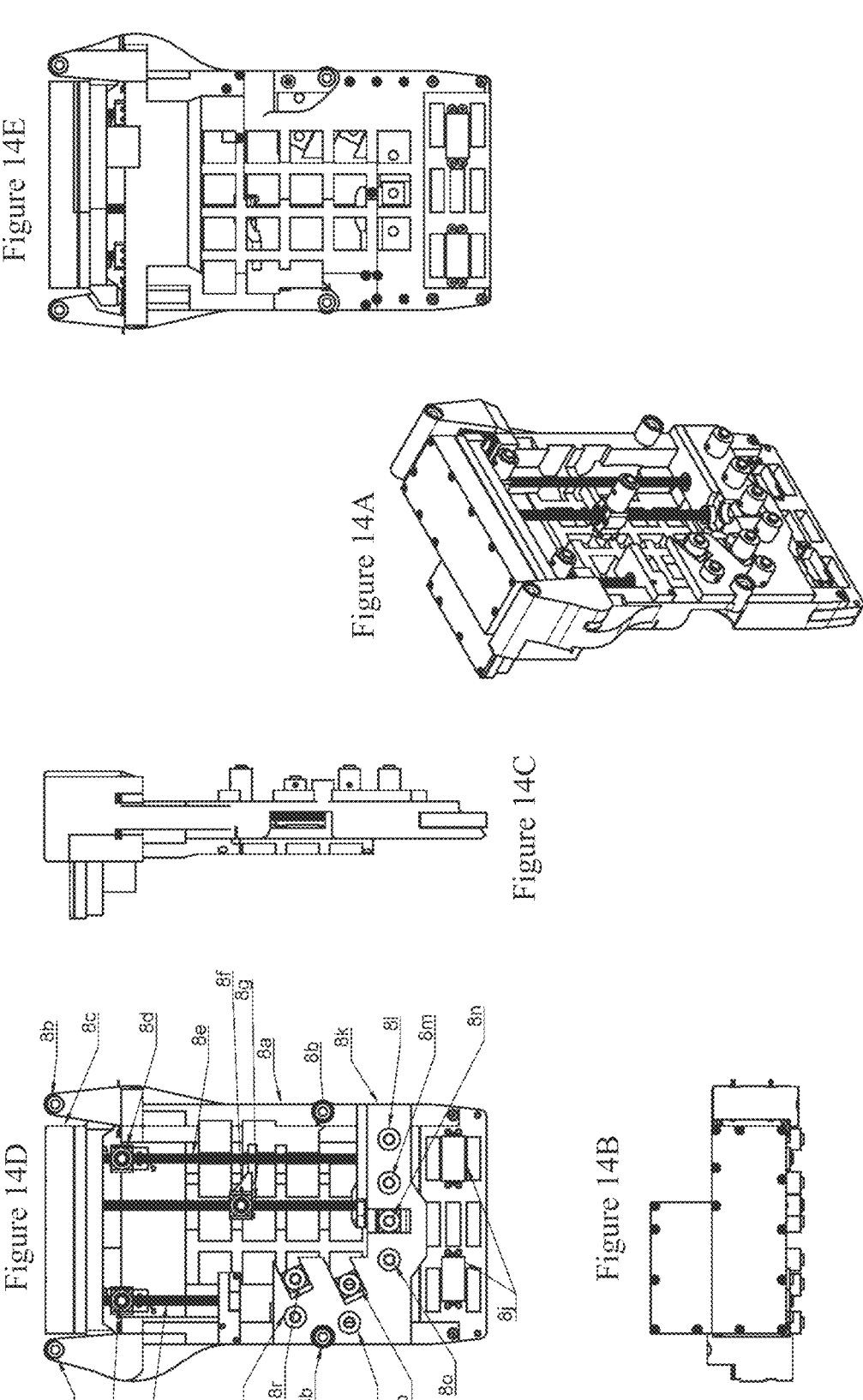

Change of rotation

Figure 18B

Change in direction
of the line norm

Figure 18A

ROBOTIC GROUTER

RELATED APPLICATIONS

This application is a U.S. national stage application of International Application No. PCT/SG2023/050128, filed Mar. 3, 2023; which application claims priority to Singapore Application Ser. No. 10/202,202458V, filed Mar. 10, 2022.

TECHNICAL FIELD

The present disclosure relates to grouting of tiles. In a particular form the present disclosure relates to a robotic grouter for grouting tiles.

BACKGROUND

After tiles are installed on a surface, grout is typically inserted to fill the gaps between adjacent tiles (or between edge tiles and a wall). Grout is fluid mixture which sets hard and is typically a cement based fluid mixture comprised of water, cement and depending upon the application, additives such as sand and polymers. Epoxy and polymer grouts are also used in certain applications, Grout is used to add mechanical strength to tiles (i.e. to support the edges and to keep them spaced apart); to protect the surface beneath the tiles; and to improve the visual appearance of the tiles.

Installing grout is laborious process in which a tool such as a trowel or grout float to push grout into the gaps. The excess grout is then progressively cleaned off the tiles using a sponge or cloth (taking care not to disrupt/remove the grout between the tiles). Given the manual and laborious nature of the task, various attempts have been made to develop improved tools and apparatus (including automated robots). However this is a challenging task as grouting must be performed on a wide range of tiles of different sizes, shapes and colours laid in a wide range of geometrical configurations. In particular, the perimeter size and shape varies significantly, and care must be taken with grouting in edges to avoid grout on walls or surrounding areas. Further the grouting must be performed in a wide range of lighting and environmental conditions (e.g. indoor and outdoor locations). Accordingly many of the tools or apparatus developed to date only useful for specific tasks such as cleaning a sponge, or operating in large open areas away from boundaries. As such they remain inefficient compared to an experienced human grouter/tiler with a trowel and sponge that is more versatile and able to grout a range of different tiles (including into corners and edges) in a range of locations and environments.

There is thus a need to provide improved automated systems for grouting tiles, or to at least provide a useful alternative to existing systems.

SUMMARY

According to a first aspect, there is provided an autonomous grouting robotic apparatus comprising:
a frame:
a grout cleaning arrangement comprising:
  a sponge belt forming a loop;
  a tank;
  a sponge belt cleaning and tensioning assembly comprising a plurality of rollers;
  a front sponge guide assembly configured to guide the sponge belt over a forward tip; and a front support assembly mounted to the frame and which is configured to support the front sponge guide assembly and to control a height of the front sponge guide assembly and a tilt angle of the front sponge guide assembly with respect to a vertical axis of the autonomous grouting robotic apparatus;
a grout extruder comprising a grout extruder mounting assembly which either supports a grout storage container or is configured to receive and support a removable grout storage container, and a motorised plunger, wherein the grout storage container ends in a nozzle with a slot and is configured to receive the motorised plunger, and the grout extruder mounting assembly is configured to control a location and a height of the nozzle and to control a tilt angle of the nozzle with respect to a vertical axis of the autonomous grouting robotic apparatus;
a power system configured to provide power to the autonomous grouting robotic apparatus;
a drive system configured to drive the autonomous grouting robotic apparatus;
a control system comprising at least one processor, at least one memory, at least one LIDAR, at least one image sensor, and at least one motion sensor, wherein the at least one imaging sensor is mounted to the frame to observe a composite field of view in front of the autonomous grouting robotic apparatus, and the at least one motion sensor is configured to detect motion of the autonomous grouting robotic apparatus, and the control system is configured to process at least a plurality of images and a plurality of LIDAR scans to map a room and identify a plurality of grouting line where each grouting line corresponds to a gap between tiles, and to control the drive system, the grout extruder and the grout cleaning arrangement to control extrusion of the grout from the nozzle and to clean excess grout off tiles, such that when extruding grout the slot is aligned along the grouting line.

In one form, the slot of the nozzle ends in a nozzle tip, and when viewed from the side, a front face of the nozzle is inclined rearward with respect to the nozzle tip and the vertical axis such that an angle from the grouting line to the front face is greater than 90 degrees, and when viewed from the front the nozzle has a symmetrical chamfered profile such that a left side and a right side each define an opening angle with the vertical axis of less than 45 degrees.

In a further form, the slot comprises a plurality of gaps each separated by projection separator that protrudes out of the slot to compress grout into the tile gap.

In one form, the grout extruder mounting assembly is mounted on the front sponge guide assembly such that tilting the front sponge guide assembly also tilts the grout extruder mounting assembly.

In a further form, the grout storage container is a grout cartridge and the grout extruder mounting assembly comprises a lower mount and an upper mount, wherein the lower mount has an inverted U shaped profile such that when mounted to the front sponge guide assembly the arms of the U define a gap through which the belt passes, and the upper mount is configured to support the grout cartridge and comprises a pair of guide rails which extend rearward of the upper mount and are connected to an end cap which supports the motorised plunger arrangement, and a linear actuator arrangement is configured to control extension and retraction of the grout cartridge along the guide rails to control a location of the nozzle tip with respect to a front face the upper mount, and wherein the upper mount is configured to be driven away from the lower mount so as to control an orientation of the nozzle tip as the front sponge guide assembly is tilted.

In one form, the front sponge guide assembly comprises a main support structure on which the grout extruder mounting assembly is mounted, and a plurality of rollers that defines a forward belt path around the main support structure comprising a first front powered roller to receive and drive the belt, a tip roller located distal of the front powered roller with a smaller diameter than the front powered roller to define the forward tip and guide the belt over and then under the front powered roller and towards a rear guide roller for guiding the belt back towards the sponge belt cleaning and tensioning assembly.

In a further form, the frame comprises a body frame and a front frame extending forward of the body frame, and the front support assembly comprises a first support structure mounted to the front frame which supports a pivot arrangement and a second support structure which supports the front sponge guide assembly, wherein a height of the second support structure is adjustable with respect to the first support structure, and the pivot arrangement comprises a front pivoting mount that supports a front pivoting roller and a rear roller wherein the front pivoting roller guides the sponge belt coming from the sponge belt cleaning and tensioning assembly towards the front powered roller and the rear roller receives the sponge belt from the rear guide roller and direct the belt to the sponge belt cleaning and tensioning assembly, and the front sponge guide assembly is connected to the front pivoting mount, and tilting of the front sponge guide assembly is driven by the second support structure which causes pivoting of the front pivoting mount and front pivoting roller.

In a further form the rear roller is a pivoting roller which is independently pivotable with respect to the front pivoting roller such that a pivot angle of the rear roller may be different to a pivot angle of the front pivoting roller. In a further form the apparatus further comprises a set of cascading pivoting rollers, wherein each roller in the set of cascading pivoting rollers is pivotable such that a total pivot angle or a pivoting range of the cascading pivoting rollers is larger than a pivot angle or a pivoting range of each individual pivoting roller, and either the set of pivoting rollers comprises the front pivoting roller and one or more additional pivoting rollers, or the set of pivoting rollers comprises the rear roller and one or more additional pivoting rollers and the rear roller is also a pivoting roller that is independently pivotable with respect to the front pivoting roller such that a pivot angle of the rear roller may be different to a pivot angle of the front pivoting roller, or the set of pivoting rollers comprises two sets of pivoting rollers, the first set comprising the front pivoting roller and one or more additional pivoting rollers and the second set of pivoting rollers comprises the rear roller and one or more additional pivoting rollers and the rear roller is also a pivoting roller that is independently pivotable with respect to the front pivoting roller such that a pivot angle of the rear roller may be different to a pivot angle of the front pivoting roller.

In a further form, the second support structure comprises a left frame and a right frame, and one or more guide rails that extend between the left and right frames and pass through apertures in the main support structure of the front sponge guide assembly and a threaded rod extends between the left and right frames and passes through a threaded nut in a horizontal slide arrangement in the main support structure of the front sponge guide assembly and one or both of the left and right frames comprises a motor arrangement to drive rotation of the threaded rod which drives the threaded nut along the threaded rod such that the horizontal slide arrangement translates horizontal movement into a rotation and tilting of the front sponge guide assembly, and a plurality of guide rods and one or more threaded rods connect the first support structure to the second support structure and one or more motors drive rotation of the threaded rods to adjustment the height of the first support structure with respect to the second support structure.

In one form, the frame comprises a body frame and a front frame extending forward of the body frame and the at least one imaging sensor comprises at least two imaging sensors which observe a composite field of view wherein at least one sensor is mounted to a distal end of the front frame in a forward direction and at least one imaging sensor is mounted to the distal end of the front frame in a downward direction.

In one form, the plurality of rollers direct the sponge belt through a serpentine path within the cleaning and tensioning assembly and the plurality of rollers comprises a plurality of squeezing rollers, a plurality of rinsing rollers a plurality of powered drive rollers and a plurality of tensioning rollers, wherein at least two of the plurality of squeezing rollers are located in the tank and receive the sponge belt from the front support assembly and are configured to squeeze grout out of the sponge belt and direct the sponge belt towards the plurality of rinsing rollers which are located in the tank, and at least one of the tensioning rollers directs the sponge belt out from the sponge belt cleaning and tensioning assembly towards the front pivoting roller and each of the tensioning rollers are mounted to a motor configured to adjust a position of the tensioning roller to control a tension in the sponge belt.

In one form, the control system is configured to:

map a room and identify the plurality of grout lines within the room by driving the autonomous grouting robotic apparatus around the room and collecting the plurality of images, the plurality of LIDAR scans, and motion data from the at least one motion sensor, and using a simultaneous localization and mapping (SLAM) algorithm to process the plurality of LIDAR scans and motion data to generate a map of the room, and processing the plurality of images to identify the plurality of grouting lines corresponding to gaps between tiles in the room;

grouting a room by progressively selecting each grouting line in the map until all grouting lines are selected and grouted and for each selected grouting line:

driving the autonomous grouting robotic apparatus to a starting location;

dispensing grout into the grouting line from a grout extruder mounted on the autonomous grouting robotic apparatus by controlling a location of a nozzle of the grout extruder and driving the autonomous grouting robotic apparatus to follow the grouting line wherein a precise location and a rotation angle are continuously updated using motion data from the at least one motion sensors and a plurality of images from the at least one imaging sensors captured as the autonomous grouting robotic apparatus moves;

retracing the grouting line and cleaning excess grout from the grouting line using a sponge belt guided by a front sponge guide assembly mounted on the autonomous grouting robotic apparatus, wherein if a grout line is an edge grout line, the grout extruder and the front sponge guide assembly are tilted by a tilt angle to direct the nozzle and belt over the edge grout line.

In a further form, the motion sensors comprises one or more odometry sensors configured to monitor rotation of one or more wheels of the autonomous grouting robotic apparatus.

In a further form, identification of grout lines is performed after mapping the room using the SLAM algorithm.

In a further form, when identifying the plurality of grouting lines and when updating the precise location and the rotation angle, the plurality of images are processed by a computer vision method to identify a plurality of lines, and the plurality of lines are then split by angle into a plurality of buckets where each bucket is of a pre-determined angular range and for each bucket, an average direction of the lines in the bucket is determined, and the middle of each line in the bucket is projected on a norm of an average direction of the bucket to obtain a projected point, and the lines are clustered by the projected points where each cluster corresponds to a single real grouting line whose direction and center is set to the median direction and center of the lines in the cluster.

In a further form, the pre-determined angular range of each bucket is 15 degrees.

In one form the apparatus further comprises a marker, wherein the marker is adapted to be mounted to the nozzle or the grout extruder is configured to receive a removable marker cartridge comprising a marker, and the control system is further configured to mark out a tiling map using the marker based on a tiling plan stored by the at least one memory.

In a further form the control system is configured to generate the tiling plan after generating a map of the room according to one or more design criteria.

According to a second aspect, there is provided a method of controlling an autonomous grouting robotic apparatus comprising:

mapping a room and identifying a plurality of grout lines within the room by driving an autonomous grouting robotic apparatus around the room and collecting a plurality of images from at least one imaging sensors mounted on the autonomous grouting robotic apparatus, a plurality of LIDAR scans from at least one LIDAR mounted on the autonomous grouting robotic apparatus, and motion data from at least one motion sensors configured to detect motion of the autonomous grouting robotic apparatus, and using a simultaneous localization and mapping (SLAM) algorithm to process the plurality of LIDAR scans and motion data to generate a map of the room, and processing the plurality of images to identify a plurality of grouting lines corresponding to gaps between tiles in the room;

grouting a room by progressively selecting each grouting line in the map until all grouting lines are selected and grouted and for each selected grouting line:

driving the autonomous grouting robotic apparatus to a starting location;

dispensing grout into the grouting line from a grout extruder mounted on the autonomous grouting robotic apparatus by controlling a location of a nozzle of the grout extruder and driving the autonomous grouting robotic apparatus to follow the grouting line wherein a precise location and a rotation angle are continuously updated using motion data from the at least one motion sensors and a plurality of images from the at least one imaging sensors captured as the autonomous grouting robotic apparatus moves;

retracing the grouting line and cleaning excess grout from the grouting line using a sponge belt guided by a front sponge guide assembly mounted on the autonomous grouting robotic apparatus, wherein if a grout line is an edge grout line, the grout extruder and the front sponge guide assembly are tilted by a tilt angle to direct the nozzle and belt over the edge grout line.

In one form, the motion sensors comprise one or more odometry sensors configured to monitor rotation of one or more wheels of the autonomous grouting robotic apparatus.

In a further form, identification of grout lines is performed after mapping the room using the SLAM algorithm.

In one form, when identifying the plurality of grouting lines and when updating the precise location and the rotation angle, the plurality of images are processed by a computer vision method to identify a plurality of lines, and the plurality of lines are then split by angle into a plurality of buckets where each bucket is of a pre-determined angular range and for each bucket, an average direction of the lines in the bucket is determined, and the middle of each line is projected on a norm of an average direction of the bucket to obtain a projected point, and the lines are clustered by the projected points where each cluster corresponds to a single real grouting line whose direction and center is set to the median direction and center of the lines in the cluster.

In a further form, the pre-determined angular range of each bucket is 15 degrees.

In one form the method further comprises generating a tiling plan after generating a map of the room according to one or more design criteria.

According to a third aspect there is provided an autonomous tile marking robotic apparatus comprising:

a frame;

a marker support assembly which supports a marker having a marker tip, and the marker support assembly is configured to control a location and a height of the marker tip and to control a tilt angle of the marker tip with respect to a vertical axis of the autonomous tile marking robotic apparatus;

a power system configured to provide power to the autonomous tile marking robotic apparatus;

a drive system configured to drive the autonomous tile marking robotic apparatus;

a control system comprising at least one processor, at least one memory, at least one LIDAR, at least one imaging sensor, and at least one motion sensor, wherein the at least one imaging sensor is mounted to the frame to observe a composite field of view in front of the autonomous tile marking robotic apparatus, and the at least one motion sensor is configured to detect motion of the autonomous tile marking robotic apparatus, and the control system is configured to process at least a plurality of images and a plurality of LIDAR scans to map a room and to mark locations of tiles according to a tile plan, and to control the drive system and the marker support assembly to control marking.

In one form the control system is configured to generate the tiling plan after generating a map of the room according to one or more design criteria.

According to a fourth aspect there is provided a method of controlling an autonomous tile marking robotic apparatus comprising:

mapping a room by driving an autonomous tile marking robotic apparatus around the room and collecting a plurality of LIDAR scans from at least one LIDAR mounted on the autonomous tile marking robotic apparatus, and motion data from at least one motion sensor configured to detect motion of the autonomous tile marking robotic apparatus, and using a simultaneous localization and mapping (SLAM) algorithm to process the plurality of LIDAR scans and motion data to generate a map of the room;

marking a plurality of marking locations for laying tiles according to a tiling plan by marker mounted on a marker support assembly mounted on the autonomous tile marking robotic apparatus by controlling a location of a marker tip of a marker support assembly and driving the autonomous tile marking robotic apparatus to follow a marking path wherein a precise location and rotation angle is continuously updated using motion data from the at least one motion sensor and a plurality of images captured from at least one imaging sensor mounted on the autonomous tile marking robotic apparatus as the autonomous tile marking robotic apparatus moves, wherein if a marker location is an edge marker location the marker support assembly is tilted by a tilt angle to direct a tip of the marker over the edge marker location.

In one form the method further comprises comprising generating the tiling plan after generating a map of the room according to one or more design criteria, the tiling plan comprising a plurality of marking locations.

According to a fifth aspect, there is provided a computer readable medium comprising instructions for causing a processor to implement the method of the second or fourth aspects.

BRIEF DESCRIPTION OF DRAWINGS

Embodiments of the present disclosure will be discussed with reference to the accompanying drawings wherein:

FIG. 1B is a front view of an autonomous grouting robotic apparatus according to an embodiment;

FIG. 1C is a top view of an autonomous grouting robotic apparatus according to an embodiment;

FIG. 1D is a side view of an autonomous grouting robotic apparatus according to an embodiment;

FIG. 2A is an isometric view of an autonomous grouting robotic apparatus in a tilted orientation according to an embodiment;

FIG. 2B is a front view of an autonomous grouting robotic apparatus in a tilted orientation according to an embodiment;

FIG. 2C is a top view of an autonomous grouting robotic apparatus in a tilted orientation according to an embodiment;

FIG. 2D is a side view of an autonomous grouting robotic apparatus in a tilted orientation according to an embodiment;

FIG. 3B is a front view of an autonomous grouting robotic apparatus in a configuration with a retracted grout extruder and a lifted sponge belt according to an embodiment;

FIG. 3C is a top view of an autonomous grouting robotic apparatus in a configuration with a retracted grout extruder and a lifted sponge belt according to an embodiment;

FIG. 3D is a side view of an autonomous grouting robotic apparatus in a configuration with a retracted grout extruder and a lifted sponge belt according to an embodiment;

FIG. 3E is an isometric view of an autonomous grouting robotic apparatus in a grout cleaning configuration with a retracted grout extruder and a lowered sponge belt according to an embodiment;

FIG. 3F is a front view of an autonomous grouting robotic apparatus in a grout cleaning configuration with a retracted grout extruder and a lowered sponge belt according to an embodiment;

FIG. 3G is a top view of an autonomous grouting robotic apparatus in a grout cleaning configuration with a retracted grout extruder and a lowered sponge belt according to an embodiment;

FIG. 3H is a side view of an autonomous grouting robotic apparatus in a grout cleaning configuration with a retracted grout extruder and a lowered sponge belt according to an embodiment;

FIG. 4A is an isometric view of a height adjusting support structure of an autonomous grouting robotic according to an embodiment;

FIG. 4B is a front view of a height adjusting support structure of an autonomous grouting robotic according to an embodiment;

FIG. 4C is a top view of a height adjusting support structure of an autonomous grouting robotic according to an embodiment;

FIG. 4D is a side view of a height adjusting support structure of an autonomous grouting robotic according to an embodiment;

FIG. 4E is a sectional view through section AA of FIG. 4C according to an embodiment;

FIG. 5A is an isometric view of a front sponge guide assembly of an autonomous grouting robotic according to an embodiment;

FIG. 5B is a front view of a front sponge guide assembly of an autonomous grouting robotic according to an embodiment;

FIG. 5C is a top view of a front sponge guide assembly of an autonomous grouting robotic according to an embodiment;

FIG. 5D is a side view of a front sponge guide assembly of an autonomous grouting robotic according to an embodiment;

FIG. 5E is a sectional view through section AA of FIG. 5A according to an embodiment;

FIG. 6F is a sectional view through section BB of FIG. 6B according to an embodiment;

FIG. 8A is an isometric view of a first support structure of an autonomous grouting robotic according to an embodiment;

FIG. 8B is a front view of a first support structure of an autonomous grouting robotic according to an embodiment;

FIG. 8C is a top view of a first support structure of an autonomous grouting robotic according to an embodiment;

FIG. 8D is a side view of a first support structure of an autonomous grouting robotic according to an embodiment;

FIG. 8E is a sectional view through section AA of FIG. 8B according to an embodiment;

FIG. 8F is a sectional view through section BB of FIG. 8D according to an embodiment;

FIG. 9A is a front isometric view of a front pivoting mount of an autonomous grouting robotic according to an embodiment;

FIG. 9B is a front view of a front pivoting mount of an autonomous grouting robotic according to an embodiment;

FIG. 9C is a top view of a front pivoting mount of an autonomous grouting robotic according to an embodiment;

FIG. 9D is a side view of a front pivoting mount of an autonomous grouting robotic according to an embodiment;

FIG. 9E is a back view of a front pivoting mount of an autonomous grouting robotic according to an embodiment;

FIG. 9F is a back isometric view of a front pivoting mount of an autonomous grouting robotic according to an embodiment;

FIG. 10A is an isometric view of a pivot arrangement of an autonomous grouting robotic according to an embodiment;

FIG. 10B is a front view of a pivot arrangement of an autonomous grouting robotic according to an embodiment;

FIG. 10C is a top view of a pivot arrangement of an autonomous grouting robotic according to an embodiment;

FIG. 10D is a side view of a pivot arrangement of an autonomous grouting robotic according to an embodiment;

FIG. 10E is a sectional view through section AA of FIG. 10E according to an embodiment;

FIG. 10F is a sectional view through section BB of FIG. 10E according to an embodiment;

FIG. 14A is an isometric view of a tower assembly of an autonomous grouting robotic according to an embodiment;

FIG. 14B is a front view of a tower assembly of an autonomous grouting robotic according to an embodiment;

FIG. 14C is a top view of a tower assembly of an autonomous grouting robotic according to an embodiment;

FIG. 14D is an interior side view of a tower assembly of an autonomous grouting robotic according to an embodiment;

FIG. 14E is an exterior side view of a tower assembly of an autonomous grouting robotic according to an embodiment;

FIG. 18A is a schematic illustration of updating a position of an autonomous grouting robotic apparatus using images of the ground according to an embodiment;

FIG. 18B is a schematic illustration of updating a rotation angle of an autonomous grouting robotic apparatus according to an embodiment;

In the following description, like reference characters designate like or corresponding parts throughout the figures.

DESCRIPTION OF EMBODIMENTS

Figure 1A:
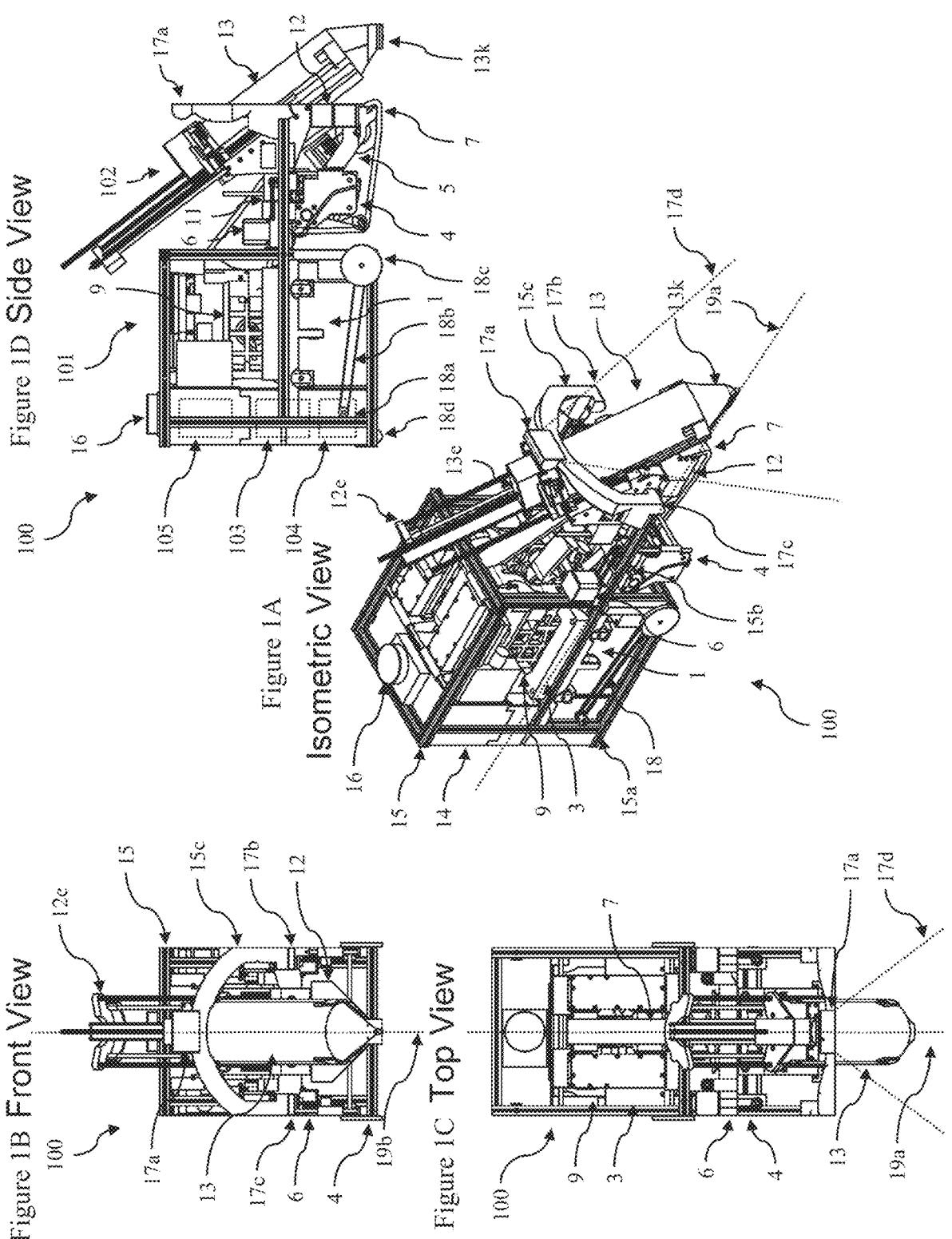
FIG. 1A is an isometric view of an autonomous grouting robotic apparatus according to an embodiment.
Figure 3A:
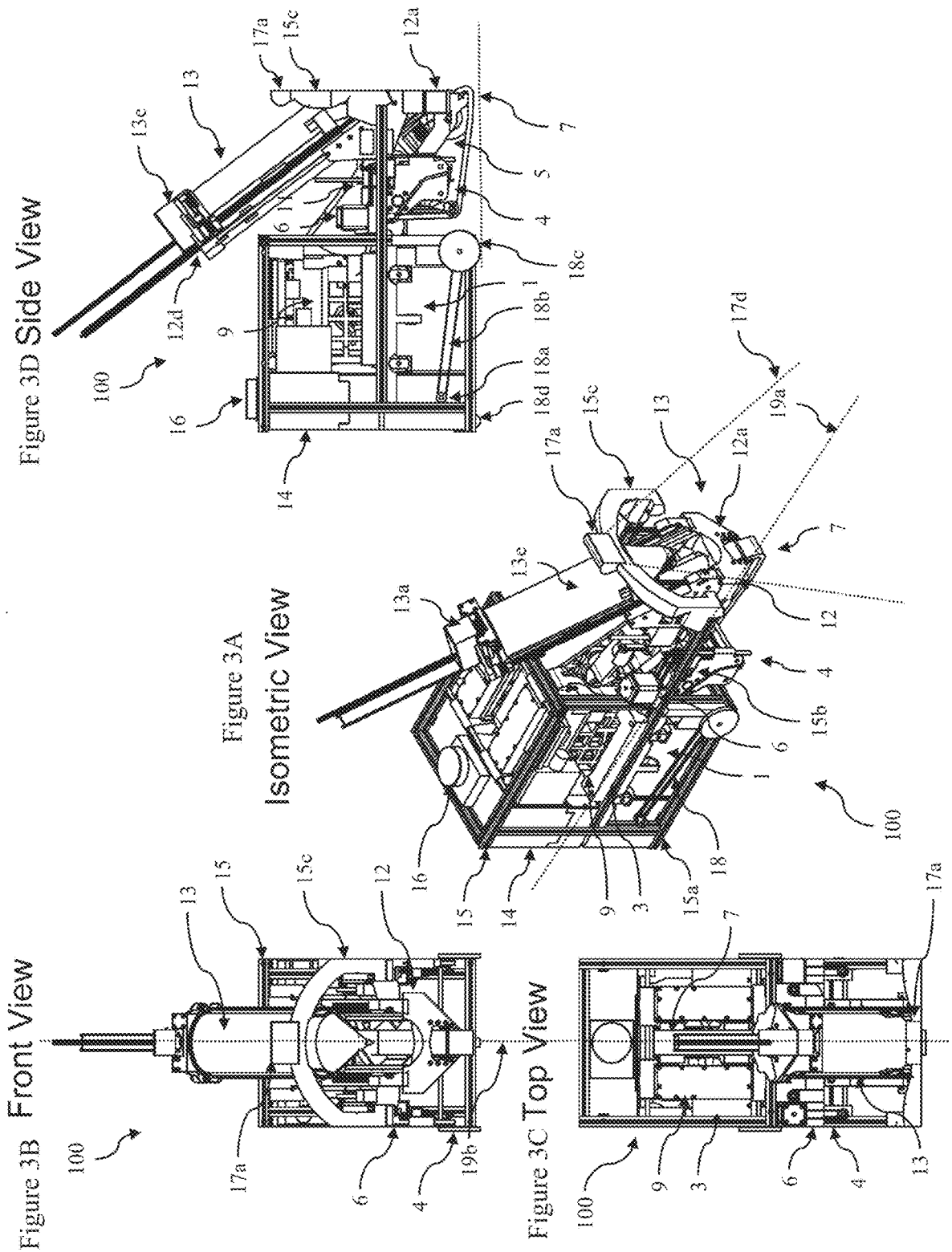
FIG. 3A is an isometric view of an autonomous grouting robotic apparatus in a configuration with a retracted grout extruder and a lifted sponge belt according to an embodiment.

Referring now to FIGS. 1A to 1D, there is shown isometric, front, top and side views of an autonomous grouting robotic apparatus 100 according to an embodiment.

The autonomous grouting robotic apparatus 100 comprises a frame 15 which supports the various components of the autonomous grouting robotic apparatus including a grout cleaning arrangement 101, a grout extruder 102, a power system 103, a drive system 104 and a control system 105.

In this embodiment the frame comprises a body frame 15a, and a forward frame 15b. The forward frame comprises left and right frame members connected via an are shaped linking support frame member 15c on which multiple cameras (each including imaging sensors) are mounted, including a centrally mounted forward viewing camera 17a, and two downward viewing cameras 17b and 17c at either ends of the linking support frame member where it meets left and right frame members. A composite field of view 17d is obtained from combining the individual overlapping field of views. The composite field of view captures the downward view directly in front of the robot where grout is to be injected or cleaned, as well as a forward view of the grouting line to the tile edge or wall and which may include adjacent grouting lines and walls or edges. The composite field of view 17d is illustrated by dotted lines in FIG. 1A. A casing or housing may be placed over the frame, but is not shown in order to illustrate the internal components.

The grout cleaning arrangement 101 comprises a sponge belt 7, a water tank 1, a sponge belt cleaning and tensioning assembly 10 comprises a plurality of rollers mounted within a tower structure 8, a front sponge guide assembly 5 and a front support assembly. The sponge belt cleaning and tensioning assembly comprises two towers 8 each mounted on the side frame members of the body frame 15a (which extend to become the left and right forward frame members 15b) via a holding structure 9. The water tank 3 is similarly mounted to the side frame members via tank supports 3 and locked in place using tank locks 2. The sponge belt 7 is looped and passes through the sponge belt cleaning and tensioning assembly 10 where it is directed to the front sponge guide assembly which is configured to guide the sponge belt over a forward tip (5q) and then back to the sponge belt cleaning and tensioning assembly 10. The front support assembly is mounted to the frame 15 and is configured to both support the front sponge guide assembly 5 and to control a height of the front sponge guide assembly 5 and a tilt angle θ of the front sponge guide assembly with respect to a vertical axis 19b of the autonomous grouting robotic apparatus.

The grout extruder 102 comprises a grout extruder mounting assembly 12 which either supports a grout storage container 13 or is configured to receive and support a removable grout storage container 13, and a motorised plunger 13g. The grout storage container 13 ends in a nozzle 13k with a slot 13k3 and is configured to receive the motorised plunger 13g. The grout extruder mounting assembly is further configured to control a location and a height of the nozzle 13k and to control a tilt angle θ of the nozzle with respect to a vertical axis 19b of the autonomous grouting robotic apparatus. In this embodiment the grout extruder mounting assembly is mounted onto the front sponge guide assembly such that tilting the front sponge guide assembly also tilts the grout extruder mounting assembly (i.e. tilt in tandem).

A dry box 14 mounted in the rear of the body frame 15a houses the components of the power system 103, drive system 104 and control system 105. The power system is configured to supply and regulate power to the various components including motors, imaging sensors (including cameras), LIDAR, sensors and processors, and includes components such as batteries, voltage converters, regulators, etc. 103. The drive system 104 is configured to drive the autonomous grouting robotic apparatus and in this embodiment comprises drive motors within the dry box 14, which drive a drive shaft (or axle) 18a, which drives wheels 18c located at the front of the body frame 15a via drive belts 18b. Free spinning rear wheels 18d are located at the rear of the body frame 15a. Placing these components in a dry box enables the apparatus to be easily cleaned by spraying the robot down with a hose.

The control system 105 comprises at least one processor, at least one memory, at least one LIDAR 16, at least one imaging sensor 17, and one or more motion sensors. The imaging sensors are mounted to the frame (or other components) to observe a composite field of view 17d in front of the autonomous grouting robotic apparatus. In the context of this specification a composite field of view refers to a field of view that includes a downward viewing portion as well as a forward viewing portion. The downward viewing portion captures to a region directly in front of the robot to view the grouting line to be grouted or cleaned, and the nozzle or cleaning belt during grouting and cleaning operations. The forward viewing portion captures the grouting line as it extends forward of the robot towards the edge of the tiles and adjacent surroundings which may include adjacent and intersecting grouting lines, as well as walls and edge of the tiles. In some embodiments the imaging sensor is a camera comprising an imaging sensor and associated optical assemblies including one or more lenses to project or direct light onto the imaging sensor. In some embodiments a camera may include multiple image sensors each with an optical assembly such that each imaging sensor has a different field of view and/or different magnification. In some embodiments multiple optical assemblies may be used to project or direct light onto a single image sensor such that it has a composite field of view such that different regions of the imaging sensor capturing different views. In some embodiments the imaging sensor may include an optical assembly with a wide angle (e.g. fish eye) lens (or lenses) to generate a composite field of view comprising forward and downward looking views. In the context of this specification the term composite field of view will encompass an imaging sensor with a wide angle lens that optically combines a forward view and a downward view. In embodiments with a single imaging sensor the composite field of view may be obtained using an optical assembly with a wide angle or fish eye lens, or an optical assembly using multiple lens assemblies where each optical assembly points in a different direction (eg down and forward) and each project onto a different portion of the sensor. In embodiments with multiple imaging sensors, each imaging sensor is mounted to view a different field of view. For example in the example show in FIGS. 1A to 1D, a first camera 17a has a forward looking view mounted on the centre of the linking support frame member 15c, and two downward looking cameras 17b and 17c at the ends of the linking support frame member 15c. These views are combined to form a composite field of view. The motion sensors, such as odometry sensors configured to monitor rotation of the wheels 18c, are configured to detect motion of the autonomous grouting robotic apparatus. The control system is configured to use at least a plurality of images and a plurality of LIDAR scans to identify a plurality of grouting lines 19a in a room where each grouting line corresponds to a gap between tiles. The control system is configured to control the drive system, the grout extruder and the grout cleaning arrangement to control extrusion of the grout from the nozzle and to clean excess grout off tiles, such that when extruding grout the slot is aligned along the grouting line 19a. This includes control of tilting of the grout extruder 102 and the front sponge guide assembly to allow extrusion (and cleaning) of grout into edges and corners.

This is further illustrated in FIGS. 2A to 2D, which show isometric, front, top and side views of the autonomous grouting robotic apparatus 100 in a tilted orientation. As noted above, because the grout extruder mounting assembly is mounted on the front sponge guide assembly the two tilt in tandem. FIGS. 3A to 3D show isometric, front, top and side views of the autonomous grouting robotic apparatus in a configuration with a retracted grout extruder and a lifted sponge belt, and FIGS. 3E to 3H show isometric, front, top and side views in a configuration with a retracted grout extruder and a lowered sponge belt.

Figures 6A, 6B, 6C, 6D, 6E, 6G:
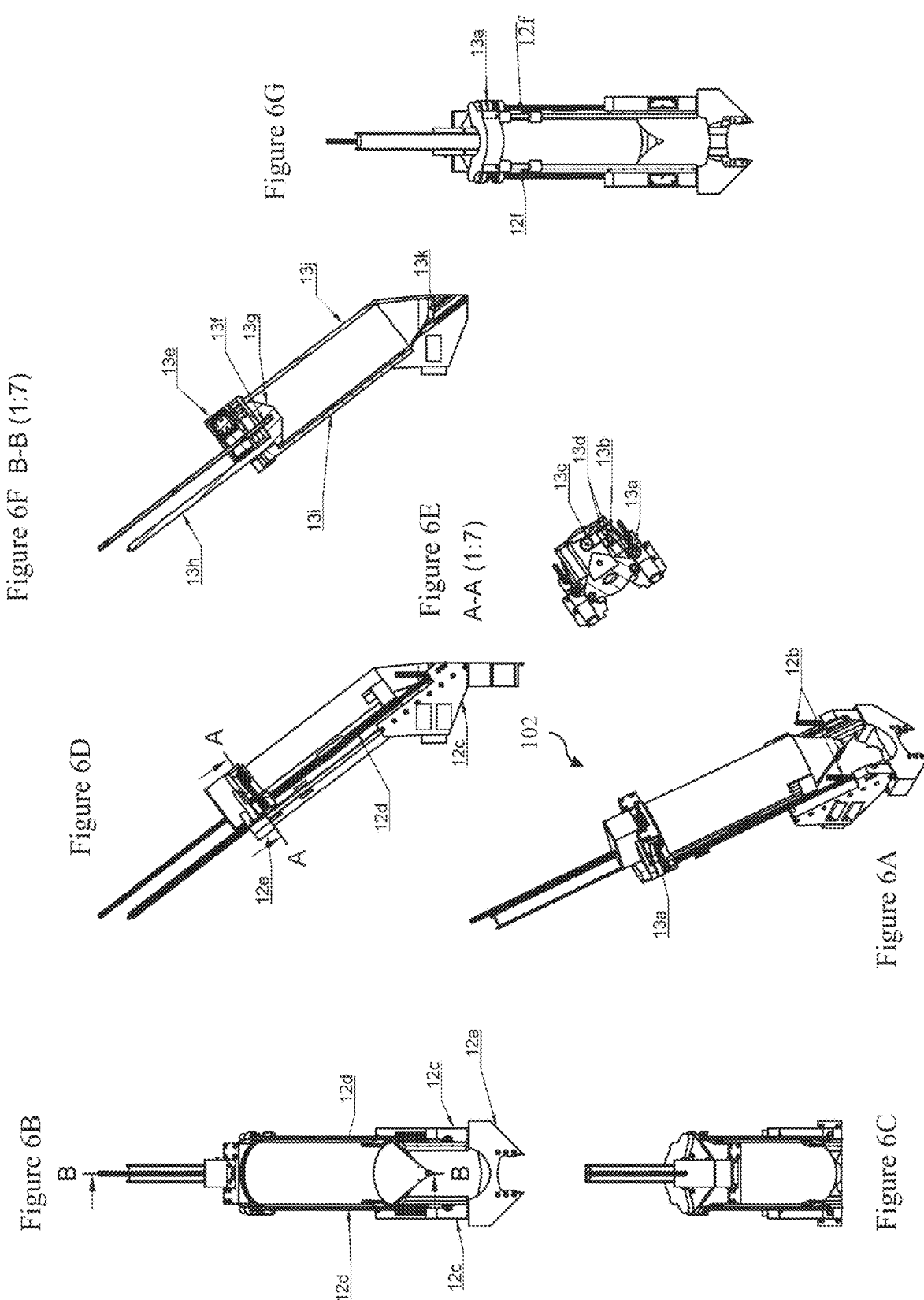
FIG. 6A is an isometric view of a grout extruder of an autonomous grouting robotic according to an embodiment.
FIG. 6B is a front view of a grout extruder of an autonomous grouting robotic according to an embodiment.
FIG. 6C is a top view of a grout extruder of an autonomous grouting robotic according to an embodiment.
FIG. 6D is a side view of a grout extruder of an autonomous grouting robotic according to an embodiment.
FIG. 6E is a sectional view through section AA of FIG. 6D according to an embodiment.
FIG. 6G is a rear view of a grout extruder of an autonomous grouting robotic according to an embodiment.

The grout extruder is further illustrated in FIGS. 6A to 6D and 6G which show isometric, front, top, side and rear views of the grout extruder including the grout extruder mounting assembly 12 and the grout storage container 13j which in this embodiment is a syringe like grout cartridge. FIG. 6E is a sectional view through section AA of FIG. 6D and FIG. 6F is a sectional view through section BB of FIG. 6B.

The grout extruder mounting assembly 12 comprises a lower mount 12a and an upper mount 12c. In this embodiment the lower mount 12a is attached to the main support structure 5b of the front sponge guide assembly 5. As noted above this assists in synchronizing movement of the grouting extruder with the sponge belt cleaning mechanism. The upper mount 12c is configured to be driven away from the lower mount 12a so as to further control an orientation of the nozzle tip as the front sponge guide assembly 5 is tilted. Trapezoidal threaded rods 12b that are connected to stepper motors (or equivalent) in 12a and are used to adjust the distance between 12a and 12c and a threaded nut is used to connect 12c to 12a through the trapezoidal threaded rod 12b. As the mechanism tilts from the centre position to the inclined, the distance between the tip and the pivot axis increases as the tilt angle changes from 0 degrees to 45 degrees, and this adjustment allows the control system to compensate for this distance change. We further note that the upper mount 12c comprises two identical components so that the upper support portion is symmetrical about the centre of the extrusion mechanism. Upper mount 12c is also attached to front pivoting mount 11g so that it pivots together with the rest of the structure.

The lower mount 12a has an inverted U shaped profile such that when mounted to the front sponge guide assembly 5 the arms of the U define a gap through which the sponge belt 7 passes. The upper mount 12c is also configured to support the grout cartridge 13j and comprises a pair of guide rails 12f which extend rearward of the upper mount and are connected to an end cap 12e which supports the motorised plunger arrangement 13g.

A linear actuator arrangement is configured to control extension and retraction of the grout cartridge along the guide rails to control a location of the nozzle tip 13k with respect to a front face the upper mount 12c as shown in FIGS. 3A to 3H. This is enabled by trapezoidal threaded rods 12g fixed to 12c on one side and end cap 12e on the other. This is to help move the grout cartridge 13 up and down the rails 12f as it extends and retracts, as to extrude grout the cartridge must extend out to the level of the sponge belt where the grout line 19a is located. Conversely, when it is not extruding grout, the grout cartridge can be retracted and lifted off the ground when no longer needed. When tilted and grouting in a corner the cartridge is extended more than when it is grouting a centre grout line 19a. Also, at the end of a grout line 19a perpendicular to the wall, it should also have enough leeway to retract such that the front most point of the grouting mechanism is behind the tip of the sponge belt 5q. This is so that the sponge belt can reach the end of the grout line and clean the entire grout line effectively without anything getting in the way. This trapezoidal threaded rod 12g is fixed in place allowing a rotating nut to instead drive the motion. Guide rails 12f are used for radial structural support and are attached to end cap 12e, the grout cartridge 13j, and upper mount 12c.

Extrusion of grout is controlled by the control system 105. Specifically a threaded nut 13a is attached to a timing belt pulley 13b is used to drive trapezoidal threaded rod 12d. A timing belt 13b is attached to 13a and a timing belt pulley 13c that is attached to a stepper motor stored in a housing 13e that is used to drive trapezoidal threaded rod 12d. A tensioning mechanism 13d is used to tension timing belt 13b. Trapezoidal threaded rod 13f is attached to plunger 13g and a non-captive stepper motor to move it up and down. The grout cartridge is used to store and extrude the grout. When the plunger 13g is fully retracted, the grout is loaded. When grout is being extruded, the stepper motor 13e pushes the plunger 13g through the trapezoidal threaded rod 13f like a linear actuator with precision so that a precise amount of grout can be extruded when needed. A guide rail 13h is also used for the plunger. As the plunger extrudes, the guide rail will gradually enter the syringe mechanism. As the trapezoidal threaded rod 13f is solidly attached to plunger 13g, it is prevented from spinning to allow the non-captive stepper motor to drive linear rather than rotational motion. The external structure of the grouting mechanism 13*i* is used to support the grout cartridge 13*j* and allows the grout cartridge 13*j* and the nozzle 13*k* to be easily detached and reloaded or replaced as necessary.

The grout cartridge 13*j* is further illustrated in FIGS. 7A to 7D which show isometric, front, top, and side views. FIGS. 7E, 7F and 7G are sectional views through sections AA, BB and CC of FIG. 7D. As shown in these figures, the slot of the nozzle 13*k* ends in a nozzle tip 13*k*3. The grouting nozzle plane 13*k*6 is the plane that would be parallel to the grout lines/grout surface and contains the opening where the grout is extruded.

Figures 7A, 7B, 7C, 7D, 7E, 7F, 7G:
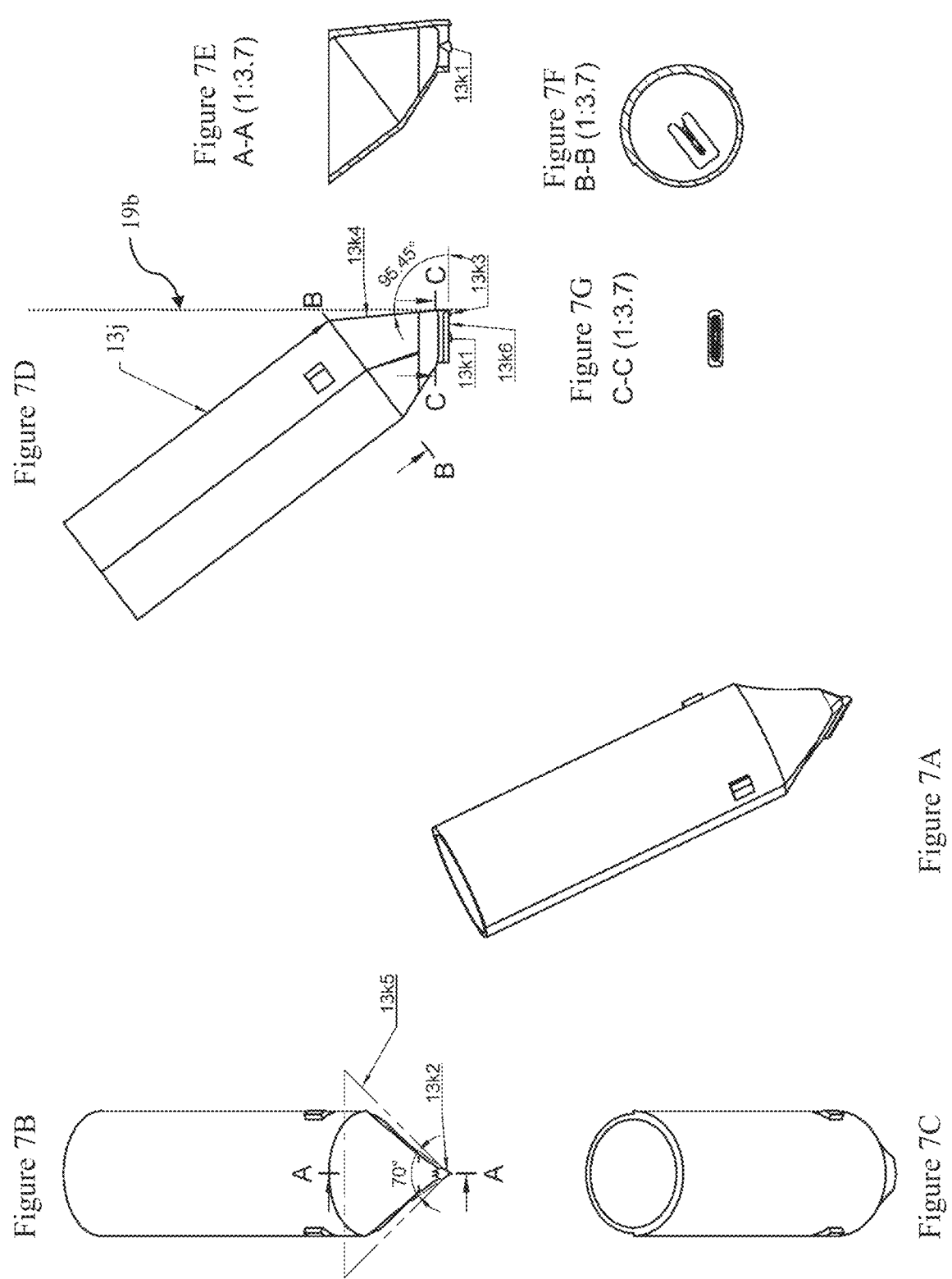
FIG. 7A is an isometric view of a grout cartridge of an autonomous grouting robotic according to an embodiment.
FIG. 7B is a front view of a grout cartridge of an autonomous grouting robotic according to an embodiment.
FIG. 7C is a top view of a grout cartridge of an autonomous grouting robotic according to an embodiment.
FIG. 7D is a side view of a grout cartridge of an autonomous grouting robotic according to an embodiment.
FIG. 7E is a sectional view through section AA of FIG. 7D according to an embodiment.
FIG. 7F is a sectional view through section BB of FIG. 7D according to an embodiment.
FIG. 7G is a sectional view through section CC of FIG. 7D according to an embodiment.
Figures 11A, 11B, 11C, 11D, 11E:
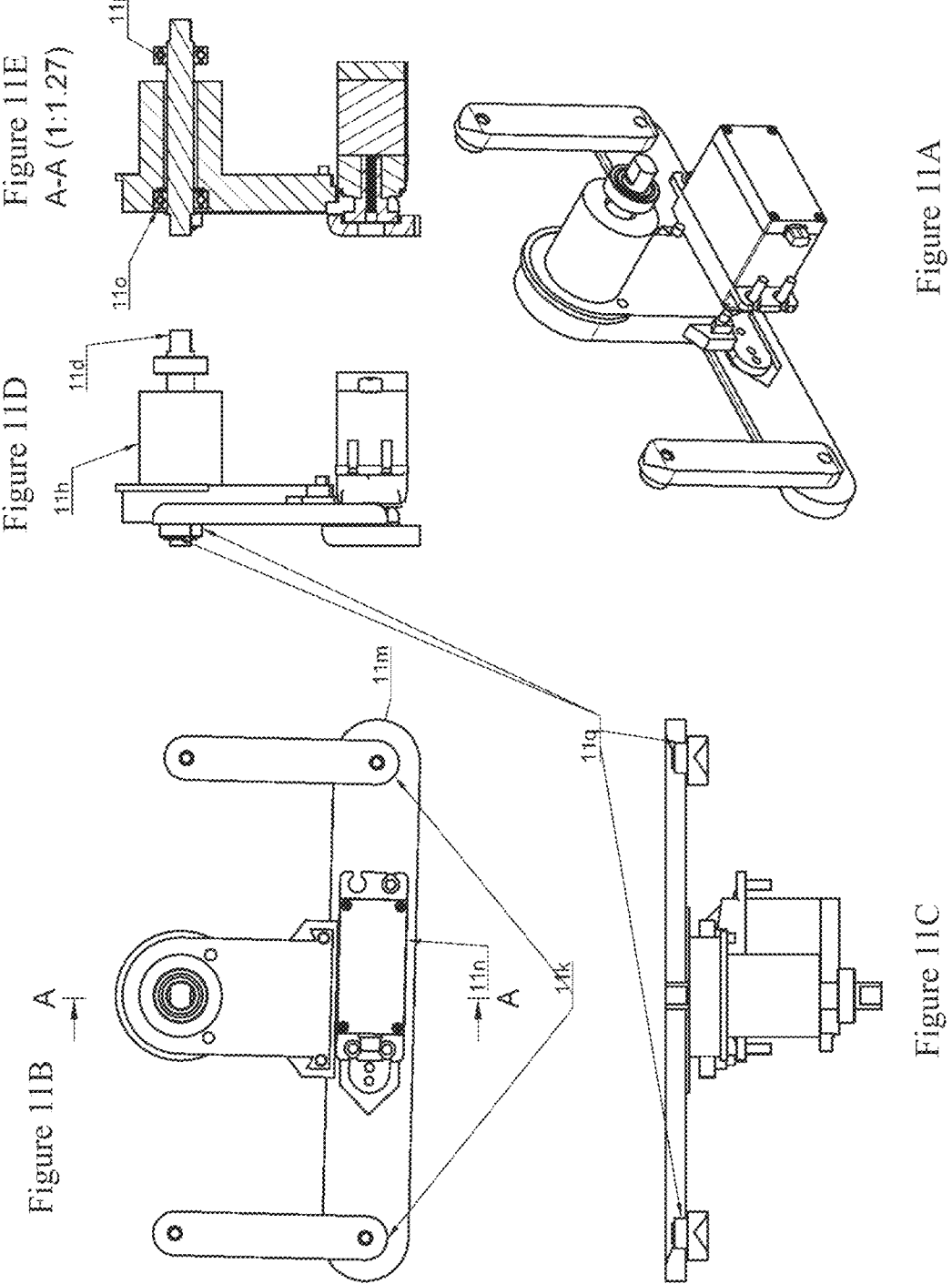
FIG. 11A is an isometric view of a rotation correction arrangement of an autonomous grouting robotic according to an embodiment.
FIG. 11B is a front view of a rotation correction arrangement of an autonomous grouting robotic according to an embodiment.
FIG. 11C is a top view of a rotation correction arrangement of an autonomous grouting robotic according to an embodiment.
FIG. 11D is a side view of a rotation correction arrangement of an autonomous grouting robotic according to an embodiment.
FIG. 11E is a sectional view through section AA of FIG. 11B according to an embodiment.
Figures 12A, 12B, 12C, 12D:
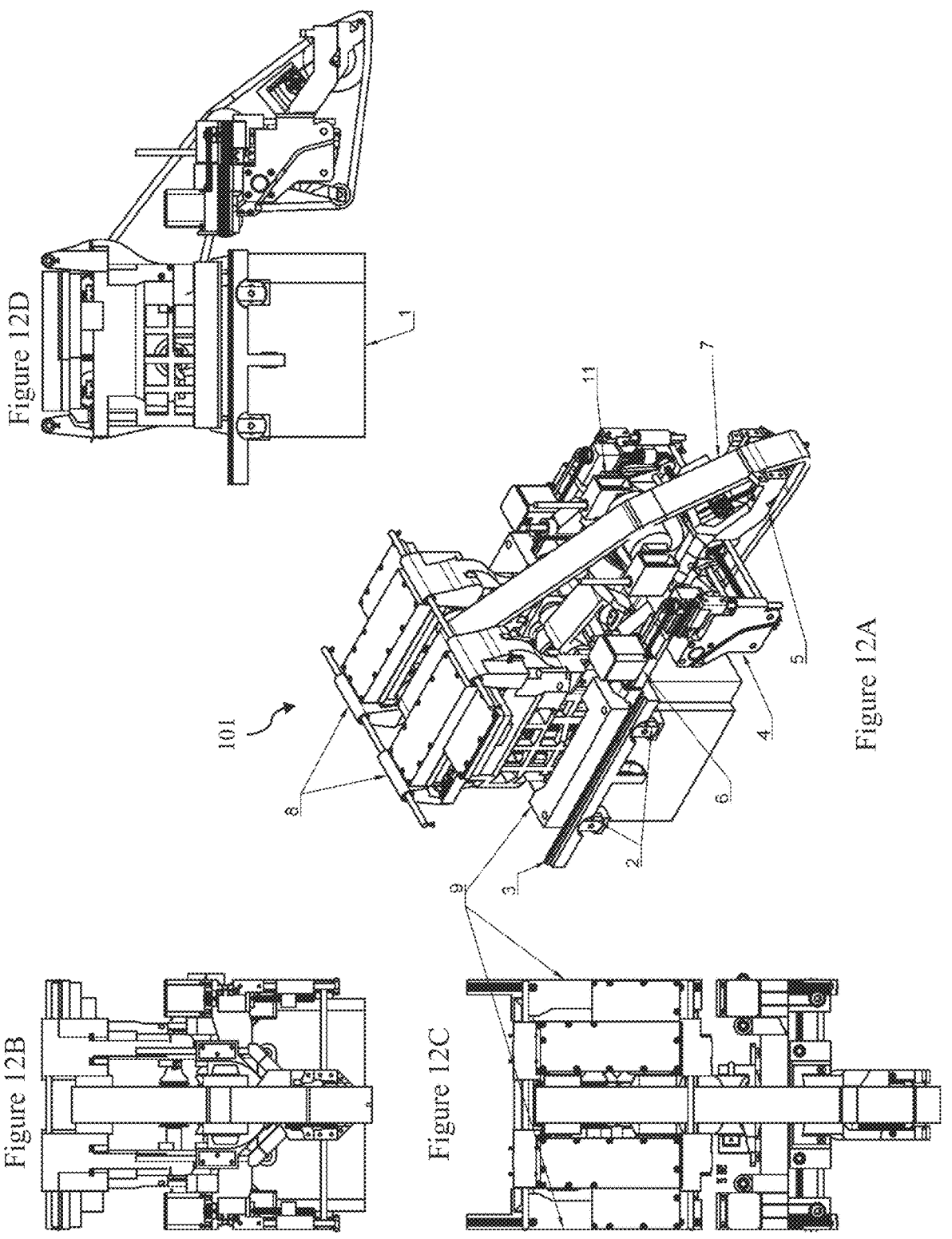
FIG. 12A is an isometric view of a grout cleaning arrangement of an autonomous grouting robotic according to an embodiment.
FIG. 12B is a front view of a grout cleaning arrangement of an autonomous grouting robotic according to an embodiment.
FIG. 12C is a top view of a grout cleaning arrangement of an autonomous grouting robotic according to an embodiment.
FIG. 12D is a side view of a grout cleaning arrangement of an autonomous grouting robotic according to an embodiment.

When viewed from the side such as shown in FIG. 7D, a front face 13*k*4 of the nozzle is inclined rearward with respect to the nozzle tip 13*k*3 and the vertical axis 19*b* such that an angle from the grouting line to the front face is greater than 90 degrees (in this embodiment 95.45 degrees). This is so that the nozzle tip is able to reach the end of a given grout line flush to the wall without anything obstructing the nozzle (i.e. getting in the way).

When viewed from the front as shown in FIG. 7B the nozzle 13*k* has a symmetrical chamfered profile 13*k*2 such that a left side and a right side each define an opening angle with the vertical axis of less than 45 degrees 13*k*5, and thus a total opening angle of less than 90 degrees (in this embodiment it is 35 degrees giving a total opening angle of 70 degrees). This ensures that the tip of the nozzle will be at the extreme corner of the whole robot, and allows the nozzle to fit into a corner against a straight wall.

In this embodiment the slot comprises a plurality of gaps each separated by projection separator 13*k*1 that protrudes out of the slot to compress grout into the tile gap (i.e. to further push grout into grout line to ensure the gap is filled). However in some embodiments this may be omitted. In this embodiment a guide slot may be placed in the nozzle tip 13*k*3. This may be inserted into the gap to be used as an additional mechanism to ensure that the robot remains in the grout line 19*a* while traveling. This is however optional and the robot can be guided purely using software. In this embodiment the grout is stored in a cartridge 13*j*. However in other embodiments the grout cartridge 13*j* may be connecting with existing industrial systems that can either prolong the pot life of mortar or to have a system that separately delivers more grout and water and mixes it on demand so that the mixed grout does not harden in the nozzle/cartridge during operation.

Figures 5F, 5G, 5H, 5I, 5J, 5K, 5L, 5M:
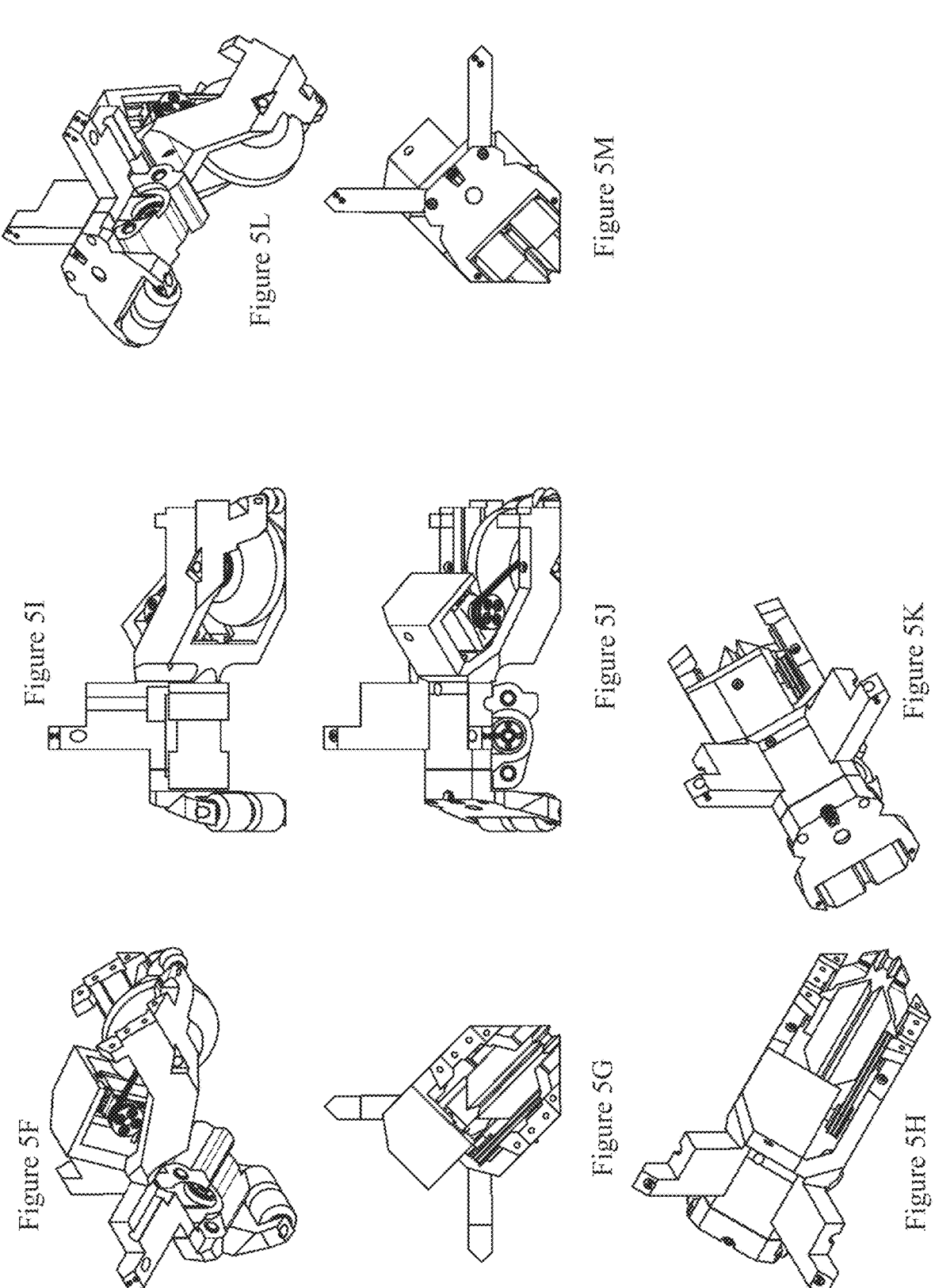
FIG. 5F is a tilted side view of a front sponge guide assembly of an autonomous grouting robotic according to an embodiment.
FIG. 5G is a tilted front view of a front sponge guide assembly of an autonomous grouting robotic according to an embodiment.
FIG. 5H is another tilted view of a front sponge guide assembly of an autonomous grouting robotic according to an embodiment.
FIG. 5I is a tilted side view of a front sponge guide assembly of an autonomous grouting robotic according to an embodiment.
FIG. 5J is another tilted side view of a front sponge guide assembly of an autonomous grouting robotic according to an embodiment.
FIG. 5K is a tilted top view of a front sponge guide assembly of an autonomous grouting robotic according to an embodiment.
FIG. 5L is another tilted view of a front sponge guide assembly of an autonomous grouting robotic according to an embodiment.
FIG. 5M is a tilted rear view of a front sponge guide assembly of an autonomous grouting robotic according to an embodiment.

Once grout is extruded, excess grout must be cleaned off the tiles. FIGS. 5A to 5D show isometric, front, top and side views of the front sponge guide assembly used to guide the distal portion of the sponge belt loop to allow cleaning of tiles. FIG. 5E is a sectional view through section AA of FIG. 5A. FIGS. 5F to 5M show various tilted views of the front sponge guide assembly. The front sponge guide assembly 5 comprises a main support structure 5*b* on which the grout extruder mounting assembly 12*b* is mounted or attached, and a plurality of rollers that defines a forward belt path around the main support structure. This comprises a first front powered roller 5*n* (on axle 5*o*) to receive and drive the belt and a tip roller 5*q* (on axle 5*r*) located distal of the front powered roller with a smaller diameter than the front powered roller 5*n* to define the forward tip of the belt (and front sponge guide assembly) and thus guides the belt over and then under the front powered roller 5*n* (over axle 5*o*) where it is directed to a rear guide roller 5*i* for guiding the belt back towards the sponge belt cleaning and tensioning assembly 10. A servo 5*k* is structurally attached to tip servo tightener 5*p* and to timing belt pulley 5*l* that is used to drive the front powered roller 5*n* via timing belt 5*m* and first front powered roller axle 5*o*. The tip servo tightener 5*p* is used to tighten or loosen timing belt 5*m* by pulling itself to main support 5*b* using bolts and hence moving servo 5*k*. The front sponge guide assembly 5 is supported by a front support assembly via two guide rods 5*a* which extend upwards from left and right side portions of the main support structure 5*b* to the front support assembly (specifically to the linear bearing of the pivot structure 11*g*2).

The forward tip may comprise a roller made of two cones stuck to each other at the base, with the tip of the cone removed and replaced with an axis through the centre of the two cones which is attached to the main structure. The small tip roller 5*q* is useful as it can fit into tight corners, while 5*n* will provide additional driving force for the sponge belt. In one embodiment the slant angle of the cone is less than 45 degrees. The sponge belt should go across the cone as seen in FIGS. 1D, 3D and 3H. In one embodiment a wedge belt is fitted to the underside of the sponge belt or the sponge belt is formed with a wedge on the inner surface so that the wedge fits between the wedge between the two cones to guide the sponge belt (and may be used to assist in driving the sponge belt). The slant angle should be such that the tip of the sponge belt mechanism would be at the corner most point when it is slanted, similar to that of the grouting nozzle, so as to ensure that the sponge belt is able to reach the corner most grout line and clean the excess grout off that line effectively. The tip of the sponge belt, like the grouting mechanism, should be at the corner most point of the robot. This can be seen in FIG. 2C when both the grouting and cleaning mechanisms are tilted.

As illustrated in FIGS. 5D and 5E, to enable tilting, the main body of the front sponge guide assembly 5 comprises a horizontal slider 5*c* which comprises two linear bearings 5*d* which connect horizontal slider 5*c* to rods 4*e* and a threaded nut 5*e* connecting horizontal slider 5*c* to a 4*d* trapezoidal threaded rod in the support structure 4. When the trapezoidal threaded rod 4*d* rotates, it drives the front sponge guide assembly Se up and down the rod which tilts the mechanism left and right. This is enabled by axle 5*g* that connects bearings 5*f* through horizontal slider 5*c* to the front structure of the main support structure 5*b* and the rear structure 5*h* of the main support structure that supports rear guide roller 5*i* on axle 5*j*. The axle 5*g* does not rotate relative to 5*b* and 5*h*. However, it rotates relative to horizontal slider 5*c* through the bearings 5*f*. This allows the horizontal movement of horizontal slider 5*c* to be translated into rotation of the entire front sponge guide assembly 5 and that ultimately allows the sponge belt 7 and grouting mechanism to be at a 45 degrees angle so that grout can be applied and cleaned off corners and edges.

The front sponge guide assembly 5 is supported (indirectly) from the frame 15 (in this embodiment by left and right forward frame members 15*b*) by a front support assembly that enables the sponge belt height to be adjusted (see FIG. 3H) and tilted (see FIG. 2C) to allow cleaning in corners and edges. FIGS. 8A to 8D show isometric, front, top and side views of a first support structure 6. FIGS. 4A to 4D show isometric, front, top and side views of the height adjusting support structure 4 supported by the first support structure 6 and which supports the front sponge guide assembly 5.

The front support assembly comprises a first support structure 6 mounted to the front frame which supports a pivot arrangement 11 and a second support structure 4 which supports the front sponge guide assembly 5. The height of the second support structure 4 is adjustable with respect to the first support structure 6, and the pivot arrangement 11 comprises a front pivoting mount 11g that supports a pivoting roller 11a and a rear roller 11i. The rear roller 11i guides the sponge belt 7 coming from the sponge belt cleaning and tensioning assembly 10 towards the rear guide roller 5i which directs the belt forward towards the front powered roller 5n for cleaning grout, and then over tip roller 5q and back over front powered roller 5n and towards the front pivoting roller 11a that receives the (dirty) sponge belt and directs the belt back to the sponge belt cleaning and tensioning assembly 10. That is the cleaning belt moves in a counterclockwise direction (when viewed side on) so that it can pick up and clean off the grout. However in other embodiments the belt could be driven in the opposite direction (clockwise). The front pivoting roller 11a has an axle 11c is supported by a structure 11b. The front pivoting mount 11g is connected to the front sponge guide assembly 5 and to upper mount 12c of the grout extruder mounting assembly, and tilting of the front sponge guide assembly 5 is driven by the second support structure 4 which causes pivoting of the front pivoting mount 11g and pivoting roller 11i. A linear bearing 11g2 is attached to the side of the structure 11g that connects to guide rods 5a of front sponge guide assembly 5. The rear roller 11i may be a fixed roller, or it may be a pivoting rear roller, or it may be fixed on a specific angle. The pivoting angle of the rear roller 11i may be different to the pivoting angle of the pivoting roller 11a. That is each of the pivoting roller 11a and rear roller 11i are independently pivotable (or variable). In some embodiments multiple pivoting rollers may be arranged to have a cascading arrangement. Each roller in the cascade can have a different pivot angle or pivoting range such that the cascade provides a larger pivot angle or pivoting range than an individual roller, and this may be independent of the pivot angle of the front roller. That is a plurality of rollers (including cascading rollers and multiple sets of cascading rollers) may be used to guide the belt along an optimal belt path. A first set of cascading rollers may be comprise the front pivoting roller 11a and one or more additional pivoting rollers and a second set of cascading rollers may comprises the rear roller 11i (in a pivoting configuration) and one or more additional pivoting rollers. In one embodiment just the first set is used, whilst in another embodiment just the second set, and in another embodiment both first and second sets are used. Using both the first and second sets provides greater control allowing the belt to be gradually guided to and from the tip thus more reliably applying and cleaning grout in extreme angles.

The second support structure 4 comprises two frames 4a (a left frame and a right frame), and one or more (in this case two) guide rails 4e that extend between the left and right frames 4a and pass through apertures 5d in the main support structure 5b of the front support assembly and a threaded rod 4d extends between the left and right frames 4a and passes through a threaded nut Se. One or both of the left and right frames 4a comprises a motor arrangement such as stepper motors 4c to drive rotation of the threaded rod 4d (and tilting of the front sponge guide assembly). This is illustrated in FIG. 4E. Timing belt pulleys 4f are driven by timing belts 4g which are in turn connected to another set of timing belt pulleys 4h that are directly driven by the stepper motors 4c. The timing belts 4g transfers the force between the pulleys 4f and 4h. A tensioning structure 4i is provided for timing belts 4g.

The second support structure is connected to the first support structure via two rods (axles) 4b connecting the frame 4a to linear bearings 6h of the first support structure and two rods (axles) 6b connecting the first support structure to linear bearings 4k. Height adjustment is provided by trapezoidal threaded rods 6a which are received in threaded nuts 4j attached to frame 4a and powered by stepper motors 6c. The motors 6c drive rotation of the threaded rods 6a to adjust the height of the first support structure 4 with respect to the second support structure 6 (which is fixed to the frame 15b). Timing belt pulleys 6d and 6f are attached to threaded rods 6a and stepper motors 6f respectively, and a timing belt 6e connects pulleys 6d and 6f. A bearing holder 6i holds trapezoidal threaded rod 6a from sliding upwards by pressing on a bearing, and a bearing holder 6l holds 6a from sliding downwards, by pressing on a bearing from the opposite side of 6i. A clip 6j holds the bearing holding 6i and bearing holder 6l against 6g and also grips rods 6b. An end stop 6k is shown and gets triggered by frame 4a as it lifts up. A single end stop may be used, or two end stops may be used (one for each side).

The first support structure 6 comprises a main frame 6g that supports pivot arrangement 11 for pivoting the belt and is shown in FIGS. 10A to 10F, and the pivoting mount 11g shown in FIGS. 9A to 9F and rotation correction arrangement 11k shown in FIGS. 10A to 10F. A ball bearing housing 6g1 connects the first support structure 6 to pivot arrangement 11 pivoting about the marked axis (+). A support structure 6g2 connects the first support structure 6 to the main frame 15.

Front pivoting mount 11g comprises a part 11g1 that connects with the large ball bearing 11f. A ball bearing 11p is housed by structure 11g3. A part 11g4 connects to the servo 11n. The main arc 11g5 allows the roller 11a and its structure 11b the freedom of motion to tilt as needed. A main clip 11h is used fasten ball bearing 11f to the middle of axle 11d, while holding the ball bearing 110 in place at the top, while connecting to the main structure 11g at the bottom for extra strength. Rear support structure 11e supports rear guide roller 11i through an axle 11j and receiving the rotation correction arrangement 11k. A rotational pivot axis is defined by axle 11d connecting structure 11b to rear support structure 11e, and is attached to ball bearings 11o and 11p, passing through the ball bearing 11f, the front pivoting mount 11g, and the main clip of the pivot 11h. The largest ball bearing 11f in the structure is held between the main pivot structure 11g1 and main clip 11h on the inner side and the ball bearing housing on the static structure on the ball bearing housing 6g1.

A rotation correction arrangement is provided and comprises a varied correction pivot connector 11k and a varied correction pivot bar 11m. A servo 11n is attached to pivot bar 11m to assist with a rotation that "corrects" (or adjusts) the main rotation amount in the pivot structure by a different angle (positive or negative) to that of the pivot structure to avoid the belt slipping sideways as it passes over roller 11a. Ball bearing 11o connects the main clip 11h on the outer diameter of the ball bearing to the axle 11d on the inner diameter of the ball bearing. Ball bearing 11p connects the axle 11d on the inner diameter of the ball bearing to the main structure at 11g3. Ball bearings 11q are located on the tip of both varied correction pivot bars 11m. The correction angle may be determined based on the specific sponge belt and dimensions of the belt and/or robot (and thus belt path).

After passing over the front pivoting roller 11a, the (dirty) sponge belt 7 is directed to the sponge belt cleaning and tensioning assembly 10 mounted in the body frame 15c. This is further illustrated in FIGS. 12A to 12D which show isometric, front, top, and side views of the grout cleaning arrangement 101; FIGS. 13A to 13D which show isometric, front, top, and side views show the grout cleaning arrangement with a side wall of a tower assembly removed to show a sponge belt cleaning and tensioning assembly; and FIGS. 14A to 14E which show isometric, front, top, and side views of the tower assembly 8.

The sponge belt cleaning and tensioning assembly 10 comprises a plurality of rollers direct the sponge belt through a serpentine path within the cleaning and tensioning assembly. The plurality of rollers comprises a plurality of squeezing rollers 10*j*, 10*k*, 10*l*, 10*m*, a plurality of rinsing rollers 10*f*, 10*g*, 10*h*, 10*i*, a plurality of powered drive rollers 10*d*, 10*e* and a plurality of tensioning rollers 10*a*, 10*b* and 10*c*. The plurality of rinsing rollers are located in the tank 1 to rinse the sponge belt, At least two of the squeezing rollers are located in the tank 1 and are configured to squeeze grout out of the sponge belt. Each of the tensioning rollers is mounted to a motor configured to adjust a position of the tensioning roller to control a tension in the sponge belt. The sponge belt may be driven in either direction (clockwise or counterclockwise) to clean grout from tiles and then to clean the grout from the belt by the powered drive rollers 10*d* 10*e*. The belt may be driver in one direction for removal of grout (e.g. counterclockwise) and then lifted (vertically) off the ground and run in the opposite direction (clockwise) to clean the belt. Further the number and arrangement of the various rollers (squeezing, rinsing, tensioning, and drive) may be varied as required e.g. to improve control and/or cleaning of the belt depending upon the size of the robot and belt. In some cases excess grout forms blobs which can take some time to clean. Thus in one embodiment the sponge belt is driven counter-clockwise. This counterclockwise motion ensures the blob is continuously pushed forward by the cleaning belt (and then over the tip 5*q* and towards front pivoting roller 11*a*). It has been found that this pushing action acts to break up the blob action and/or improve the ability of the cleaning belt to pick up and remove the blob and thus improves the cleaning action by reducing time spend cleaning. In this embodiment the dirty belt is driven over front pivoting roller 11*a* towards upper tensioning rollers 10*c*, 10*a* which direct the dirty belt into the tank and then through rinsing rollers 10*f* 10*g* 10*h* 10*i* by drive rollers 10*d* and 10*e* (via third tensioning roller 10*b* located above the tank), and then through squeezing rollers 10*j* 10*k* 10*l* 10*m*, after which the clean belt is directed towards rear guide roller 11*i*.

Figures 13A, 13B, 13C, 13D:
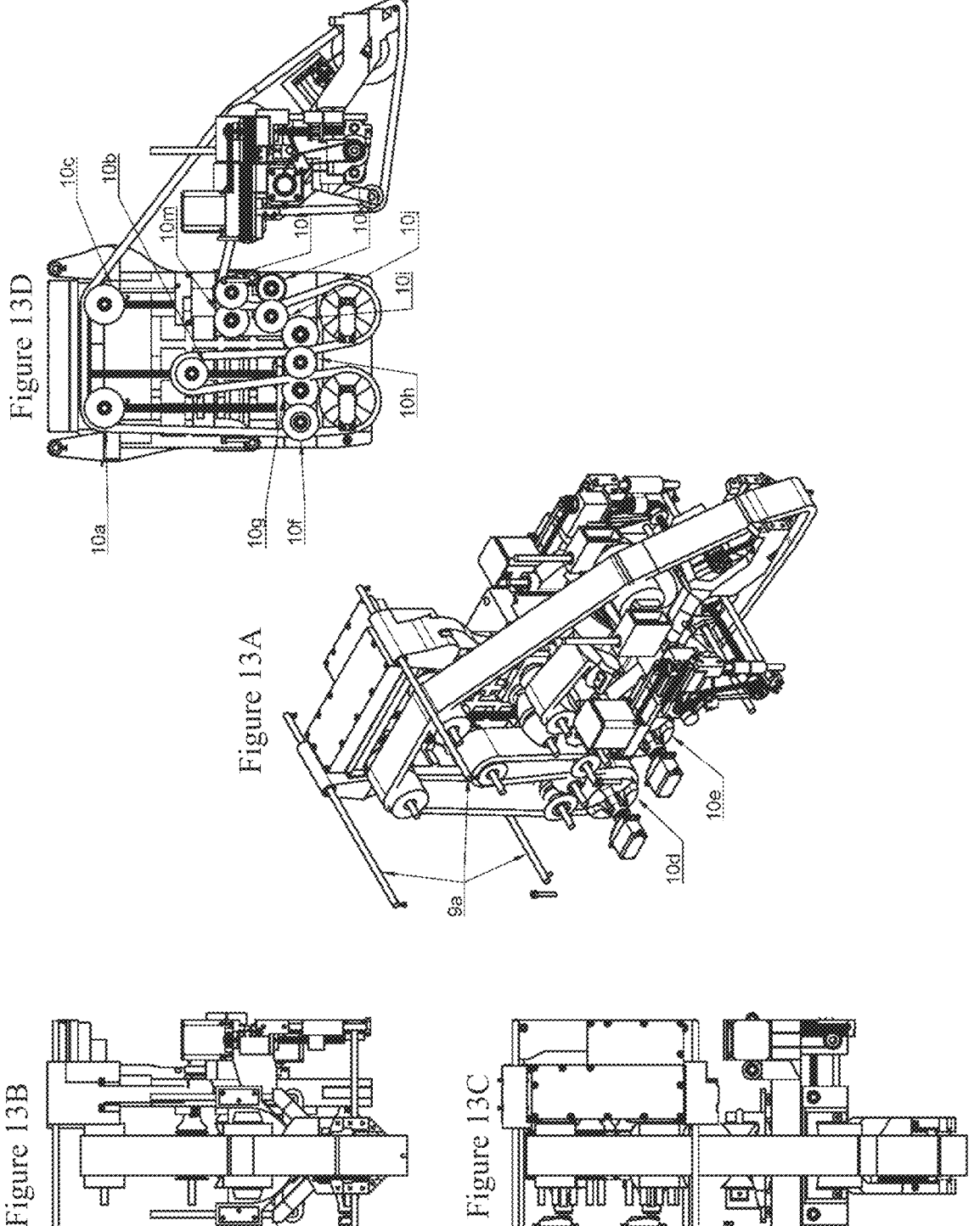
FIG. 13A is an isometric view of a grout cleaning arrangement with a side wall of a tower assembly removed to show a sponge belt cleaning and tensioning assembly of an autonomous grouting robotic according to an embodiment.
FIG. 13B is a front view of a grout cleaning arrangement with a side wall of a tower assembly removed to show a sponge belt cleaning and tensioning assembly of an autonomous grouting robotic according to an embodiment.
FIG. 13C is a top view of a grout cleaning arrangement with a side wall of a tower assembly removed to show a sponge belt cleaning and tensioning assembly of an autonomous grouting robotic according to an embodiment.
FIG. 13D is a side view of a grout cleaning arrangement with a side wall of a tower assembly removed to show a sponge belt cleaning and tensioning assembly of an autonomous grouting robotic according to an embodiment.

The path of the belt and location of the rollers is further illustrated in FIGS. 13D and 14D. The tower assembly 8 comprises a main frame 8*a*. Linear bearings 8*b* are located at the corner of the main frame connected to rod 9*a* for structural support. A movable section housing 8*c* stores and supports the stepper motors and other electronics as required. Trapezoidal threaded rods 8*d*, 8*f* and 8*h* are each powered by a stepper motor in housing 8*c* and used to move roller holders 8*e*, 8*g* and 8*i* (respectively) up and down which in turn moves tensioning rollers 10*a*, 10*b* and 10*c* (respectively) to tension the sponge belt 7 accordingly. The motors used to drive rollers 10*d* and 10*e* are attached to plate 8*j*. These rollers provide the main driving force causing the sponge belt 7 to move. Main plate 8*k* holds the rest of the roller holders 8*l* to 8*s* that are used to hold rollers 10*f* to 10*m* (respectively) that are used to help to rinse the sponge belt. Rods 9*a* form a holding structure which holds the towers 8 containing the rollers to the main body frame 15*a* of the robot.

Figure 15A:
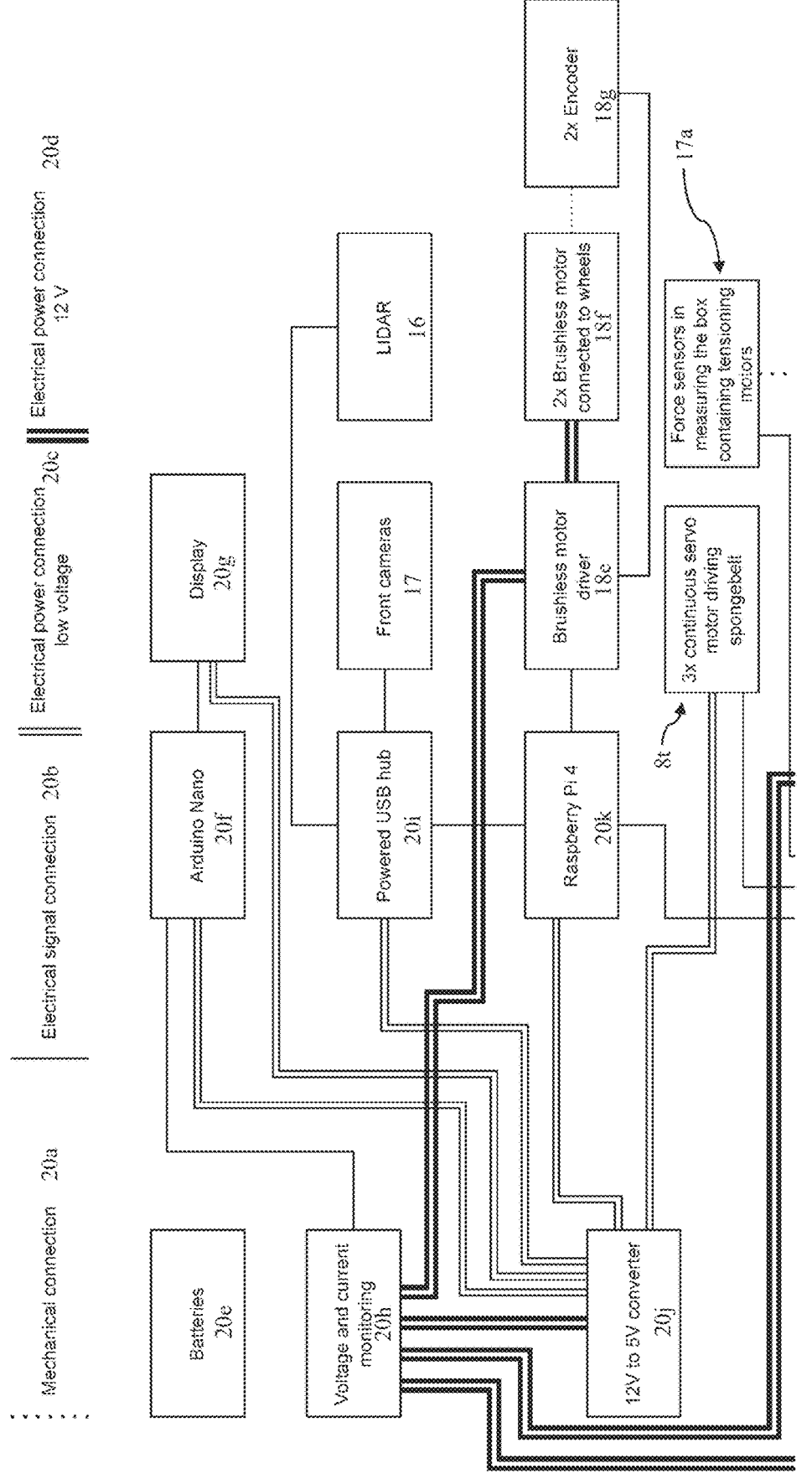
FIG. 15A is a first schematic view of electrical connections of the power, drive and control systems autonomous grouting robotic according to an embodiment.
Figure 15B:
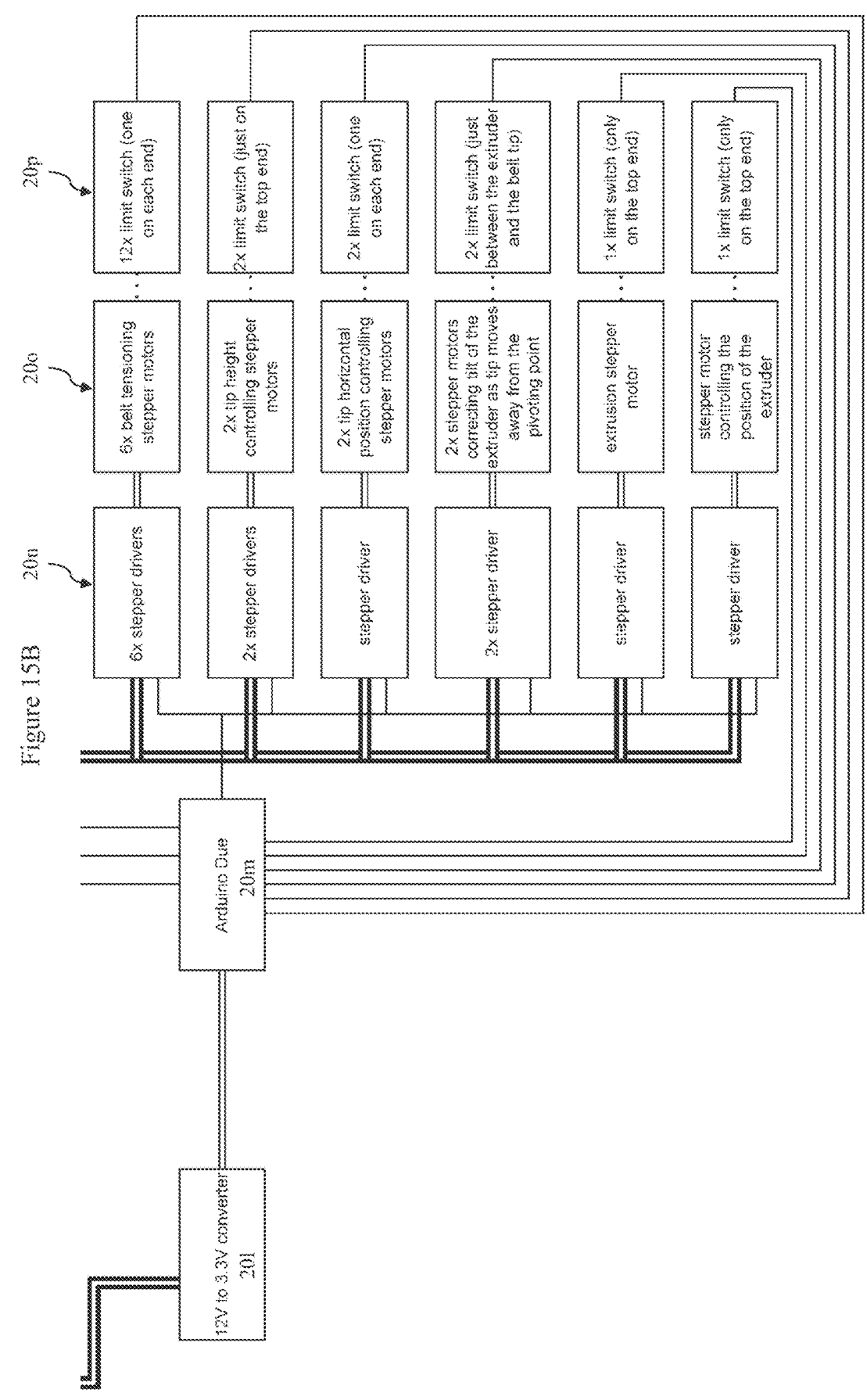
FIG. 15B is a second schematic view of electrical connections of the power, drive and control systems autonomous grouting robotic according to an embodiment.

FIGS. 15A and 15B are first and second schematic view of electrical connections of the power, drive and control systems autonomous grouting robotic. Mechanical connection 20*a* are shown as dotted lines, Electrical signal connections 20*b* as single lines, low voltage electrical power connections 20*c* are shown as a thick and thin line and 12V electrical power connections 20*d* are shown as two thick lines. The connections at the bottom of FIG. 15A are connected to matching connections at the top of FIG. 15B. In one embodiment batteries 20*e* provide power to the robot and a voltage and current monitoring circuit 20*h* generates 12V from the battery and monitors the 12V connections and is connected to a 12V to 5V converted 20*j* that provides 5V connections to various components, and to a 1V to 3V converter 10*l*. For example 12V is s provided to a brushless motor driver 18*e* and two brushless motors used to drive the wheels and to various stepper motors 20*n* used to control height and tilting of the grout extruder and cleaning arrangement. The 3V and 5V low connections are provided to an Arduino Nano 20*f*, Display 20*g*, Powered USB Hub 20*i*, Front Cameras 17, LIDAR 16, Raspberry Pi 20*k* Brushless motors 18, wheel encoders 18*g*, the servo motor driving the sponge belt, force sensors for the tensioning motors, belt tensioning stepper motors and limit switches as shown in FIGS. 15A and 15B.

FIGS. 15A and 15B are first and second schematic view of electrical connections of the power, drive and control systems autonomous grouting robotic. Mechanical connection 20*a* are shown as dotted lines, Electrical signal connections 20*b* as single lines, low voltage electrical power connections 20*c* are shown as a thick and thin line and 12V electrical power connections 20*d* are shown as two thick lines. The connections at the bottom of FIG. 15A are connected to matching connections at the top of FIG. 15B. In one embodiment batteries 20*e* provide power to the robot and a voltage and current monitoring circuit 20*h* generates 12V from the battery and monitors the 12V connections and is connected to a 12V to 5V converted 20*j* that provides 5V connections to various components, and to a 1V to 3V converter 10*l*. For example 12V is s provided to a brushless motor driver 18*e* and two brushless motors used to drive the wheels and to various stepper motors 20*n* used to control height and tilting of the grout extruder and cleaning arrangement. The 3V and 5V low connections are provided to an Arduino Nano 20*f*, Display 20*g*, Powered USB Hub 20*i*, Front Cameras 17, LIDAR 16, Raspberry Pi 20*k* Brushless motors 18, wheel encoders 18*g*, the servo motor driving the sponge belt 7, force sensors for the tensioning motors, belt tensioning stepper motors and limit switches as shown in FIGS. 15A and 15B.

As outlined above a control system 105 is used to control the drive system, the grout extruder and the grout cleaning arrangement to control extrusion of the grout from the nozzle and to clean excess grout off tiles, such that when extruding grout the slot is aligned along the grouting line 19*a*. FIGS. 16A to 16E illustrates behaviour tree representations of a method 30 of controlling the autonomous grouting robotic apparatus according to an embodiment. The control system enables driving with sub-millimetre localization and rotation with respect to the grouted gap which prevents damage to the syringe nozzle sticking into the gap.

Figure 16A:
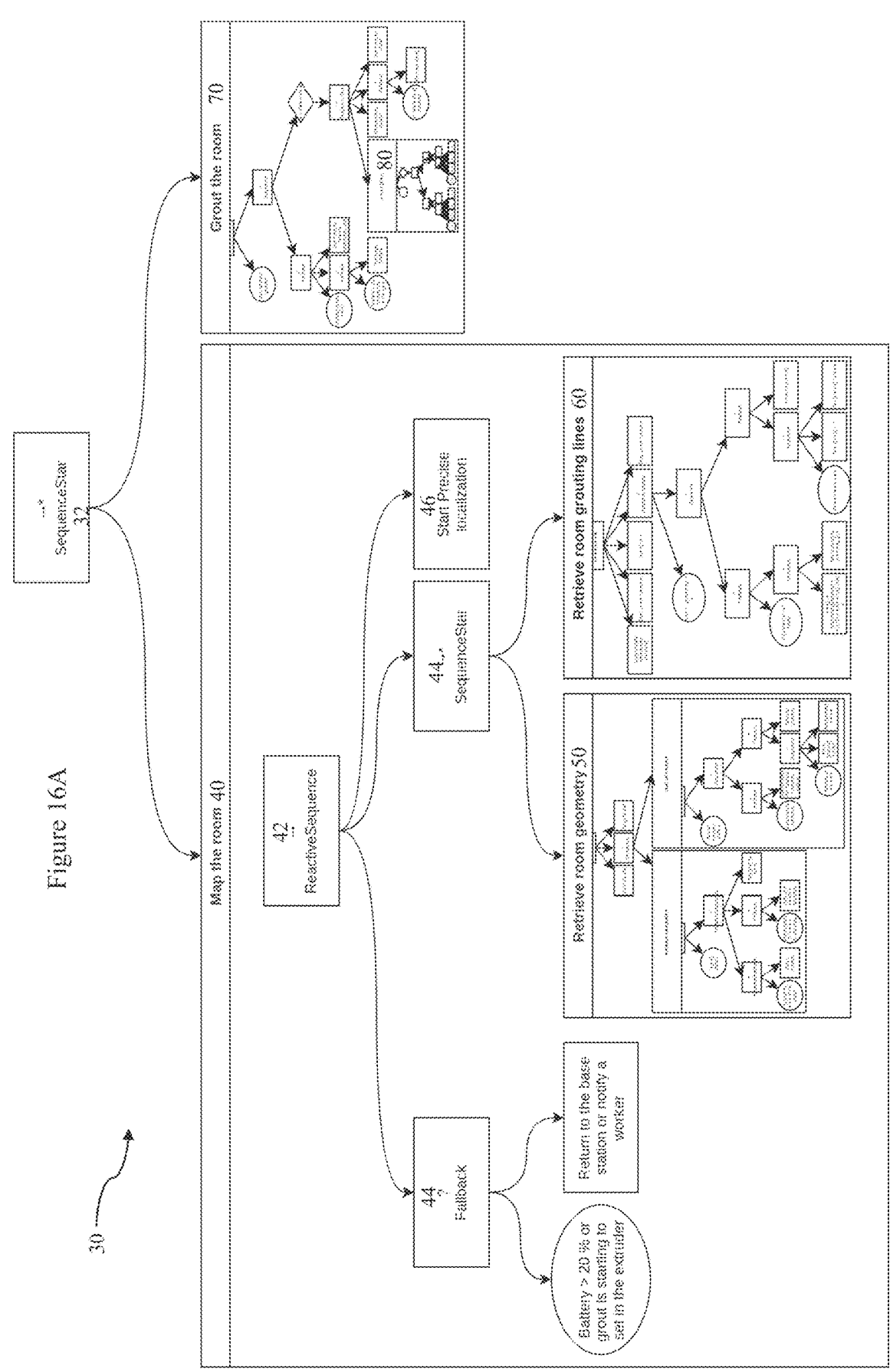
FIG. 16A is a behaviour tree representation of a method of controlling an autonomous grouting robotic apparatus according to an embodiment.

As shown in FIG. 16A, the method broadly comprises mapping the room 40 to determine both the geometry and precise locations of grouting lines 19*a*, and then grouting the room 70 using the precise map generated at step 40. This method is implemented by one or more processors in the control system 105 and is represented as behavioural trees in FIGS. 16A to 16E. A flowchart of a method for generating a map of a room is shown in FIG. 17A, and performing localisation of the robot, that is determining a precise (e.g. sub-millimetre accuracy) location of the robot is shown in FIG. 17B.

Mapping the room, and identifying grout lines 50 broadly comprises placing and driving the autonomous grouting robotic apparatus around the room and collecting a plurality of images from a plurality of imaging sensors (17*a*, 17*b*, 17*c*) mounted on the robot, a plurality of LIDAR scans from the LIDAR(s) 16 mounted on the robot, and motion data from one or more motion sensors configured to detect motion of the robot. A simultaneous localization and mapping (SLAM) algorithm 52 to process at least the LIDAR scans and motion data to generate a map of the room. The SLAM algorithm is computationally demanding and requires iteratively processing the 2D LIDAR scans and motion data, and may use other data such as image data to generate and refine the map. SLAM algorithms are implemented in a range of computational libraries/software packages such as NumPy, OpenCV, TensorFlow, Matlab, etc. Identification of the precise locations of the grouting lines (corresponding to gaps between tiles in the room) within the room (in the map coordinates/reference frame) is performed by analysing at least the image data from the one or more image sensors, although other data such as LIDAR scans may also be used. Identification of lines may be performed using a range of image processing and object detection algorithms implemented in a range of computational libraries/software packages such as NumPy, OpenCV, TensorFlow, Matlab, etc. Mapping the room geometry and identifying the precise locations of grouting lines 19*a* may be performed simultaneously (e.g. as part of the SLAM algorithm), as parallel processes, or sequentially in which the geometry of the room is first determined using the SLAM algorithm, followed sequentially by determining the precise locations of the grout lies within the room. Thus in some embodiments the SLAM algorithm is performed first to generate the map, and then the locations of the grouting lines within the map is determined. This sequential approach was found to provide improved performance over the simultaneous or parallel estimation approaches. In this embodiment a 2D LIDAR is used, however in other embodiments other LIDAR systems including 3D time of flight LIDAR systems may be used. In this embodiment the motion sensors comprise wheel odometry sensors such as wheel encoders which measure rotation of the wheels. However in other embodiments other motion sensors such as accelerometers, gyroscopes, inertial navigation systems (INS), ultrasonic, laser and radio frequency based range finder systems may be used.

Figure 16B:
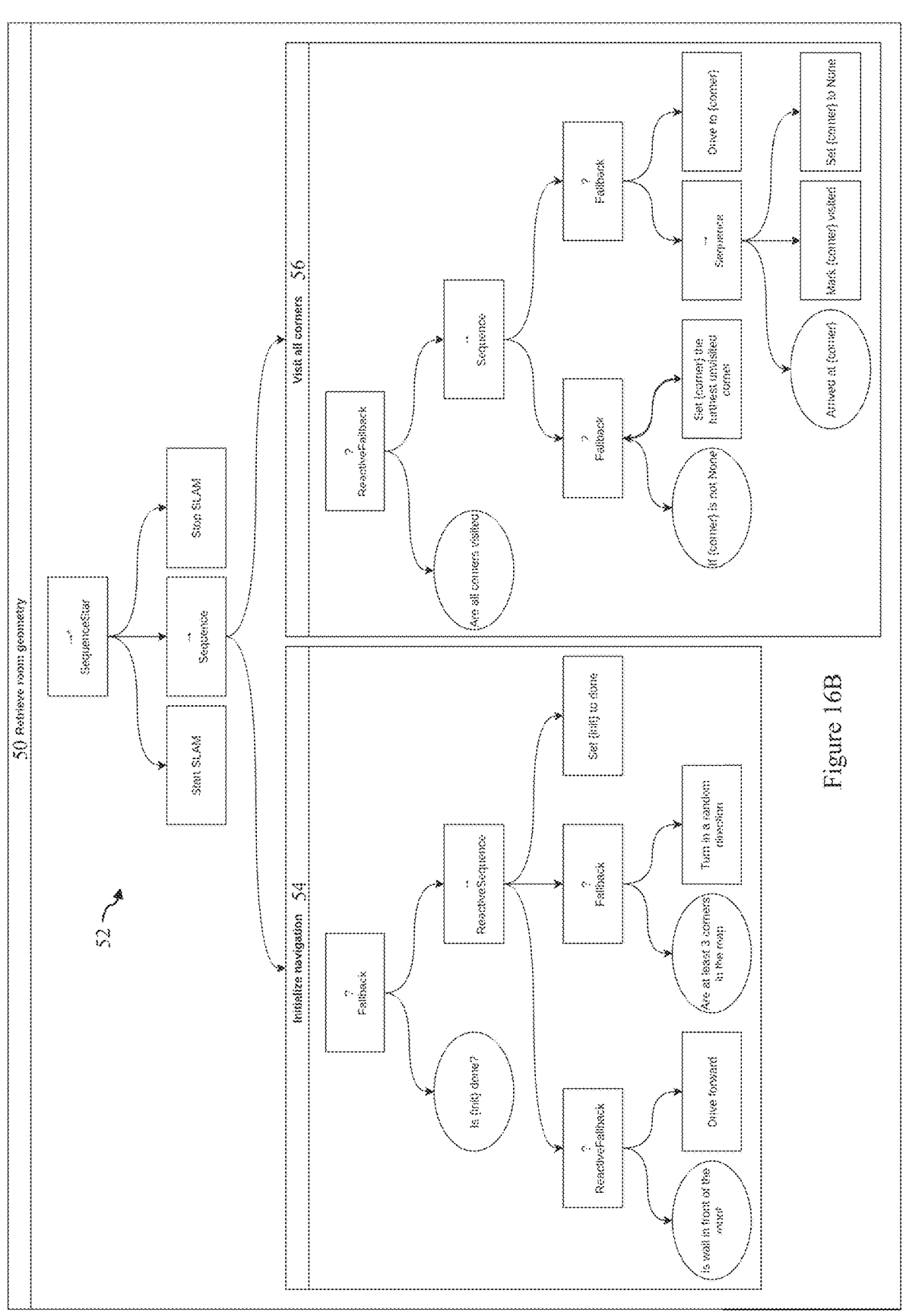
FIG. 16B is a behaviour tree representation of a method of controlling an autonomous grouting robotic apparatus according to an embodiment.
Figure 16C:
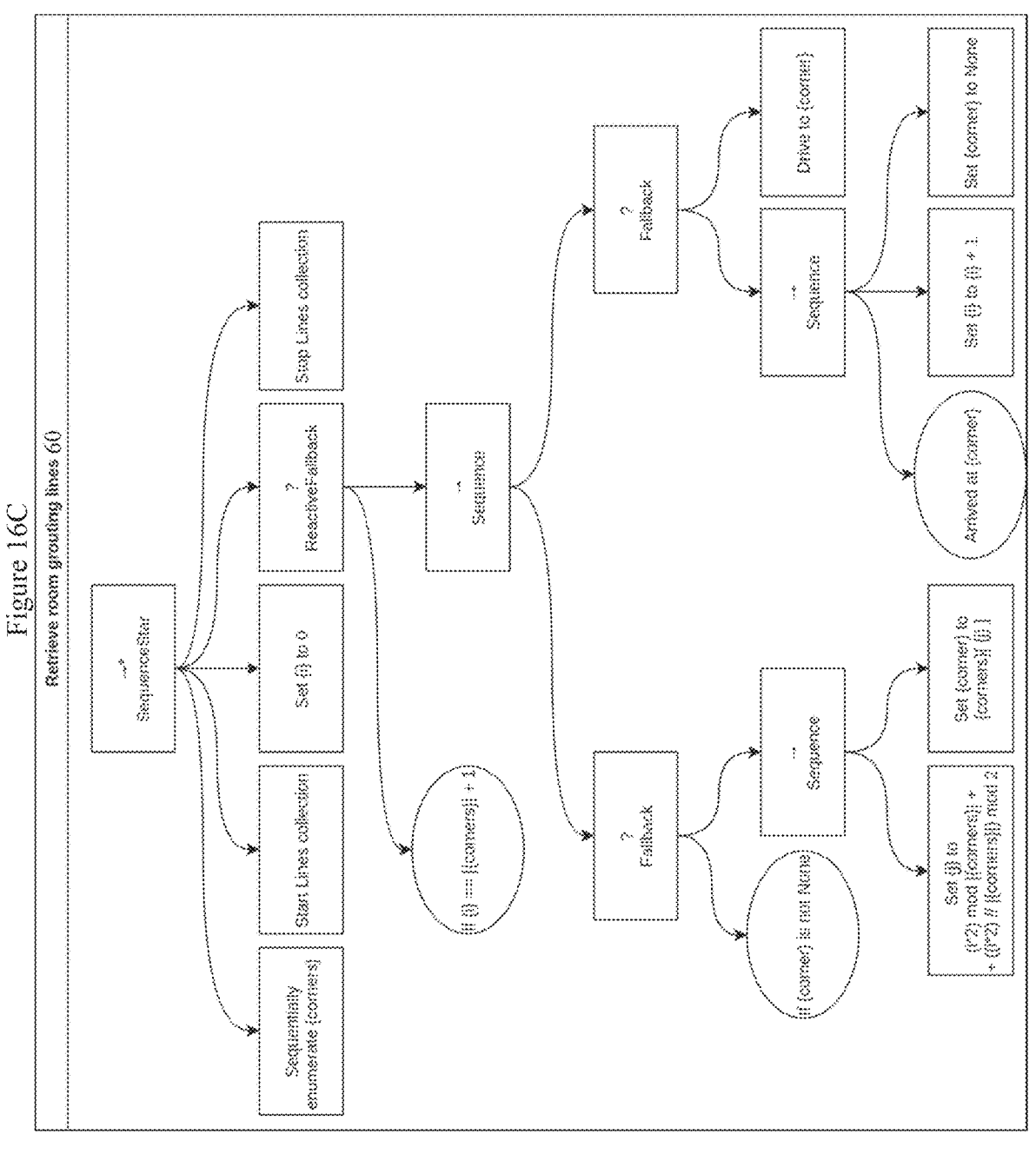
FIG. 16C is a behaviour tree representation of a method of controlling an autonomous grouting robotic apparatus according to an embodiment.
Figure 17A:
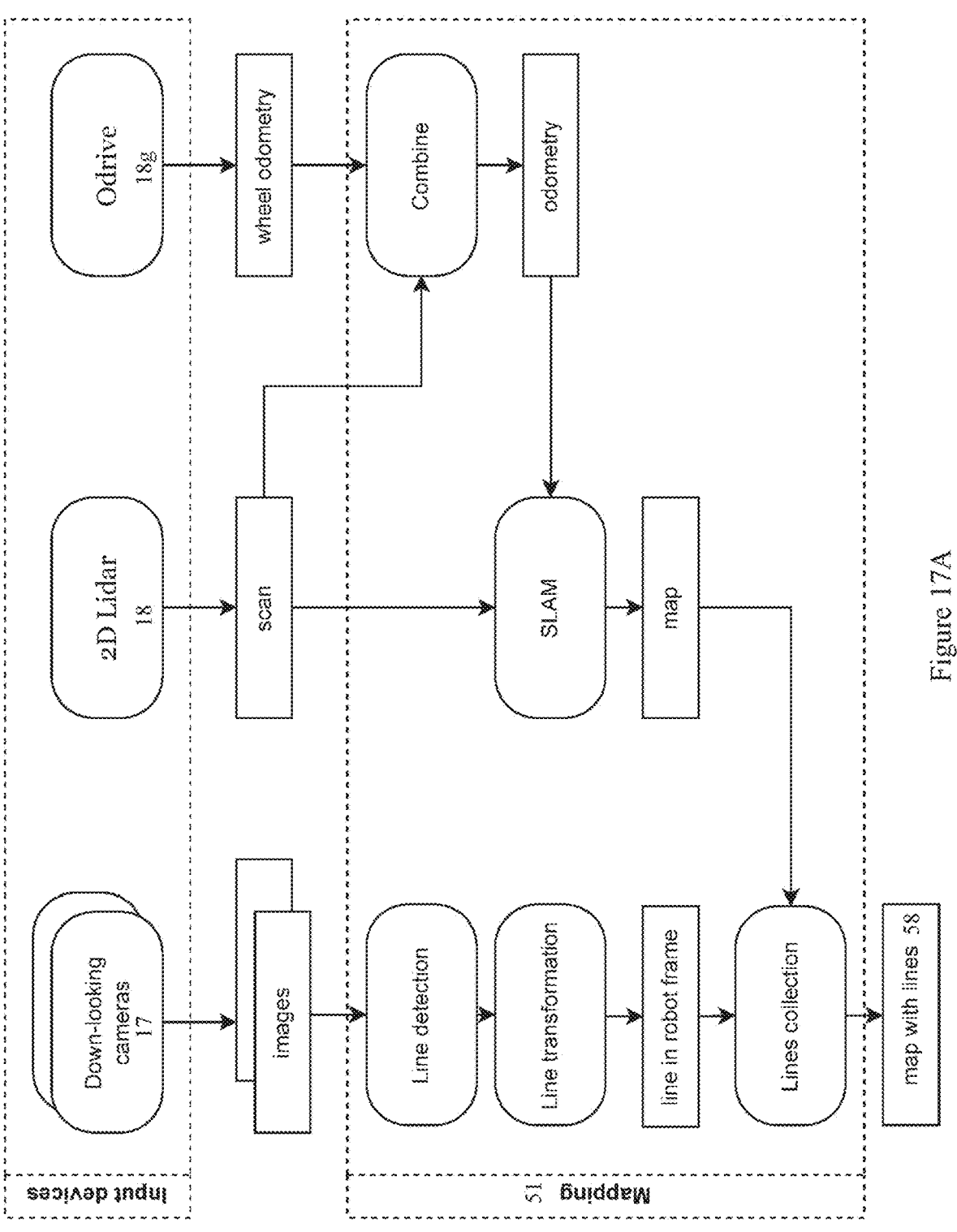
FIG. 17A is a flowchart of method of generating a map of a room with grouting gaps by a control system in an autonomous grouting robotic apparatus according to an embodiment.
Figure 17B:
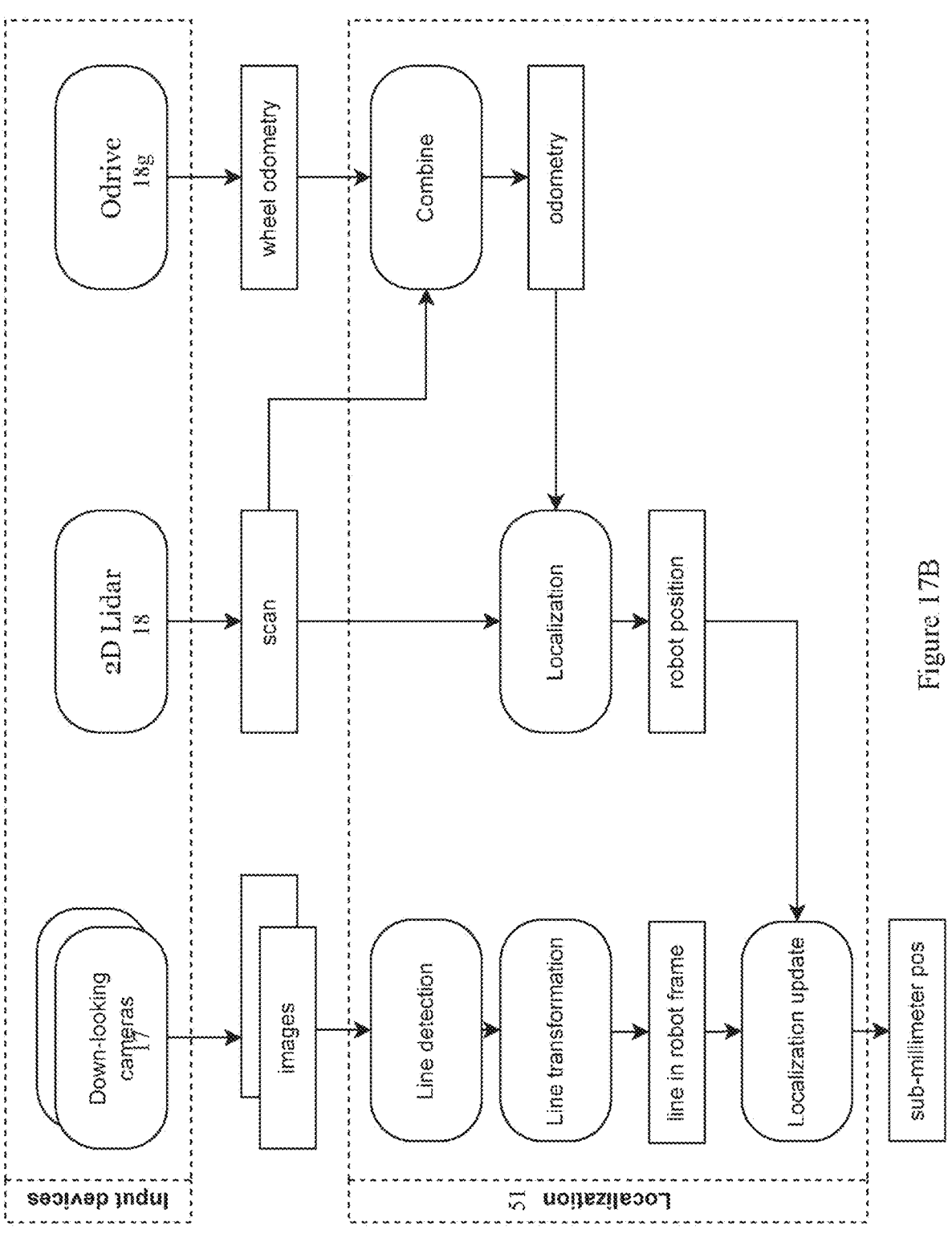
FIG. 17B is a flowchart of method of determining a precise location of an autonomous grouting robotic apparatus by a control system in an autonomous grouting robotic apparatus according to an embodiment.

Mapping the room is further illustrated in FIG. 16B. SLAM is initiated 52 to start the mapping process (and is stopped when mapping is complete). Navigation is initialised 54 and a random walk is performed, in which the robot drives forward until a wall is detected, and this random walk is performed until at least three corners are discovered. We then visit (drive) to all corners 56 to ensure mapping of the complete room. Odometry data, image data and LIDAR data is collected as the robot moves around the room which is processed by the SLAM algorithm to generate the map. In this embodiment, once the map is obtained identification (retrieval) of grouting lines 60 in the room (in a map coordinate system) is performed as illustrated in FIG. 16C. With the corners known, the line collection process is started by first visiting all even corners (starting at 0) then all odd corners (e.g. driving to opposite corners).

As the robot moves around the room, multiple images of the grout lines are collected from the image sensors which are processed using a computer vision pipeline. As the robot visits each corner the images are collected and the lines are identified and transformed into the room coordination system (of the map). Due to inaccuracy of localization using a typical LIDAR (+−5 cm 95% confidence interval), the grout line position from a single image is imprecise. However as the noise has mean 0 multiple images can be combined to improve accuracy (e.g. by averaging or using a robust estimator such as a median). A flowchart of the generation of the map and identification of the lines is illustrated in FIG. 17B. This comprises using the LIDAR scan data and motion (e.g. Odometry) data to generate a map using a SLAM algorithm, and using image data from downward looking cameras to identify lines in the map. Image data, such as the images from the downward looking cameras is analysed to identify grouting lines in the images, although images from the forward cameras and 2D LIDAR scan data may also be used. In some embodiments image data collected during building of the map may be used.

Figure 16D:
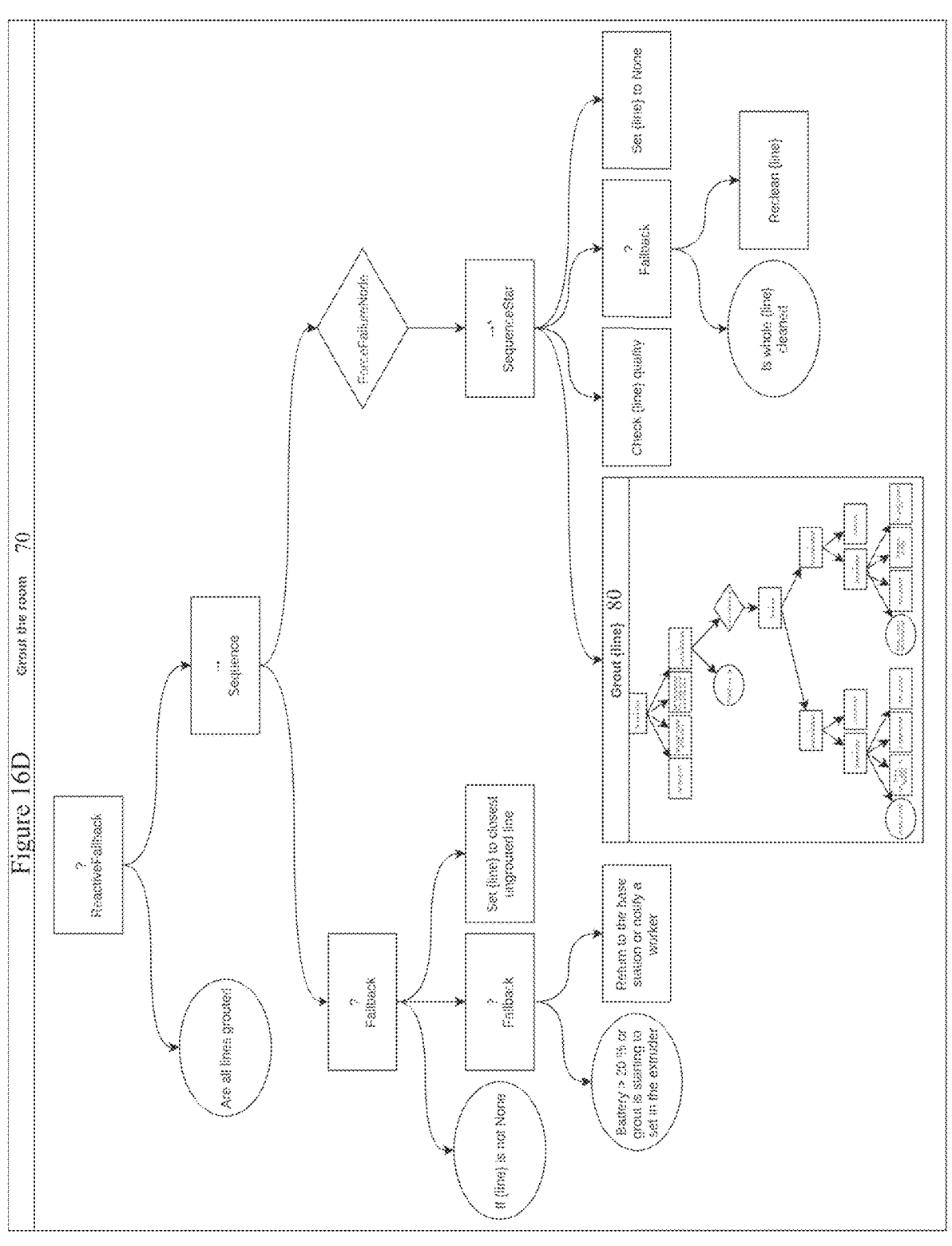
FIG. 16D is a behaviour tree representation of a method of controlling an autonomous grouting robotic apparatus according to an embodiment.

With the map and grouting lines known, grouting the room 70 is performed and broadly comprises progressively selecting each grouting line in the map and grouting each selected un-grouted line, until all grouting lines are selected and grouted. As illustrated in FIG. 16D, for each line a quality check is performed and regrouting is performed if needed. Termination or fall back conditions are also provided, so that if the battery power is low (e.g. <20%) or grout is starting to set or run out then the process is stopped and the robot returns to a base station or a worker is notified.

Figure 16E:
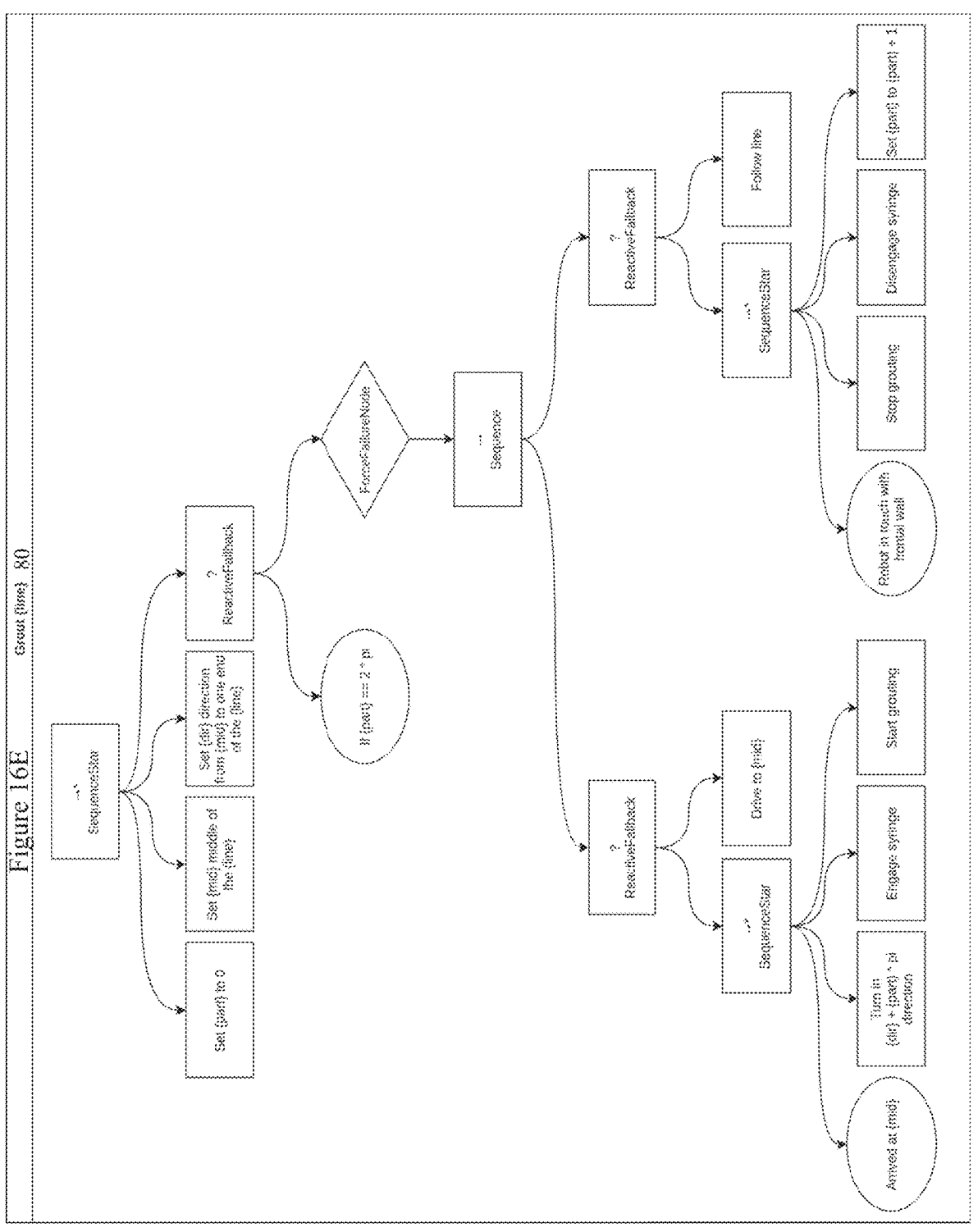
FIG. 16E is a behaviour tree representation of a method of controlling an autonomous grouting robotic apparatus according to an embodiment.

Grouting of each selected grouting line 80 is illustrated in FIG. 16E and broadly comprises driving the autonomous grouting robotic apparatus to a starting location such as the middle of the line. The robot turns to one end of the line and begins dispensing grout into the grouting line and the line is followed until the wall is met. The robot turns around and this is repeated for the other half of the line.

As the robot moves the precise location and rotation angle (or orientation) of the robot is continuously updated (i.e. continuous localisation). This comprises collecting motion data, such as odometry data from encoders on the wheels, and a plurality of images from the plurality of image sensors. LIDAR scans may also be obtained from the LIDAR. The motion data and image data is processed using a localisation algorithm to obtain a precise location and a rotation angle of the robot to allow an update to the location of the robot in the map/room coordinate system. This is illustrated in FIG. 17B. A computer vision pipeline analyses images to identify lines whilst motion data and optionally LIDAR scan data is used to determine an approximate position in the map. The data is combined to refine the position and rotation angle of the robot. In one embodiment, during navigation SLAM is turned off and only localisation is performed as the robot moves. During navigation the map (room geometry) is retrieved, and motion data (e.g. odometry data) used to track positon, which is then periodically updated using images of lines collected from the imaging sensors. This may optionally be further updated or verified by 2D LIDAR scan data if required.

Dispensing grout into the grouting line is performed by controlling a location of the nozzle of the grout extruder and driving the autonomous grouting robotic apparatus to follow the grouting line. The precise location and rotation angle are continuously updated using the motion (odometry data) as well as additional images from the plurality of imaging sensors (e.g. downward looking cameras) captured as the autonomous grouting robotic apparatus moves. LIDAR scan data may optionally also be collected to assist in localisation. Retracing of the grouting line and cleaning excess grout from the grouting line is performed using a sponge belt guided by the front sponge guide assembly. In the case that a grout line is an edge grout line, the grout extruder and the front sponge guide assembly are tilted by an appropriate tilt angle to direct the nozzle and belt over the edge grout line.

Initial identification of the lines in the map (FIG. 17A) and localisation, that is determining a precise location and rotation angle of the robot as it moves (FIG. 17B) is performed by processing the plurality of images using a computer vision method. In one embodiment this comprises using a line detection algorithm, such as a Fast Line Detector, or Hough transform method, in multiple images and line transformation of the line into the robot frame (map coordinate system). To improve accuracy lines are collected from multiple images, and are then split (allocated) by angle into buckets of a pre-determined angular range (e.g. each bucket may comprise a different 15 degree range). For each bucket the middle of the scanned lines (in the bucket) are projected on a norm of the average direction of the lines in the bucket, and the lines are then clustered by the projected points. Each cluster then corresponds to a single real grouting line whose direction and center is set to the median direction and center of the lines in the cluster. This process is assisted by driving over each line an odd number of times, for example in opposing directions (e.g. back and forth). LIDAR scan data may also be collected and processed to assist this process.

The localisation process is used during movement and grouting to continuously update the robot location to maintain sub-millimetre accuracy position. An initial localisation step may be performed at the starting point for grouting to identify the precise location and rotation angle of the robot prior to grouting beginning, or localisation may be performed continuously as the robot moves to the starting location and continued as the robot begins grouting.

Figures 18A, 18B:
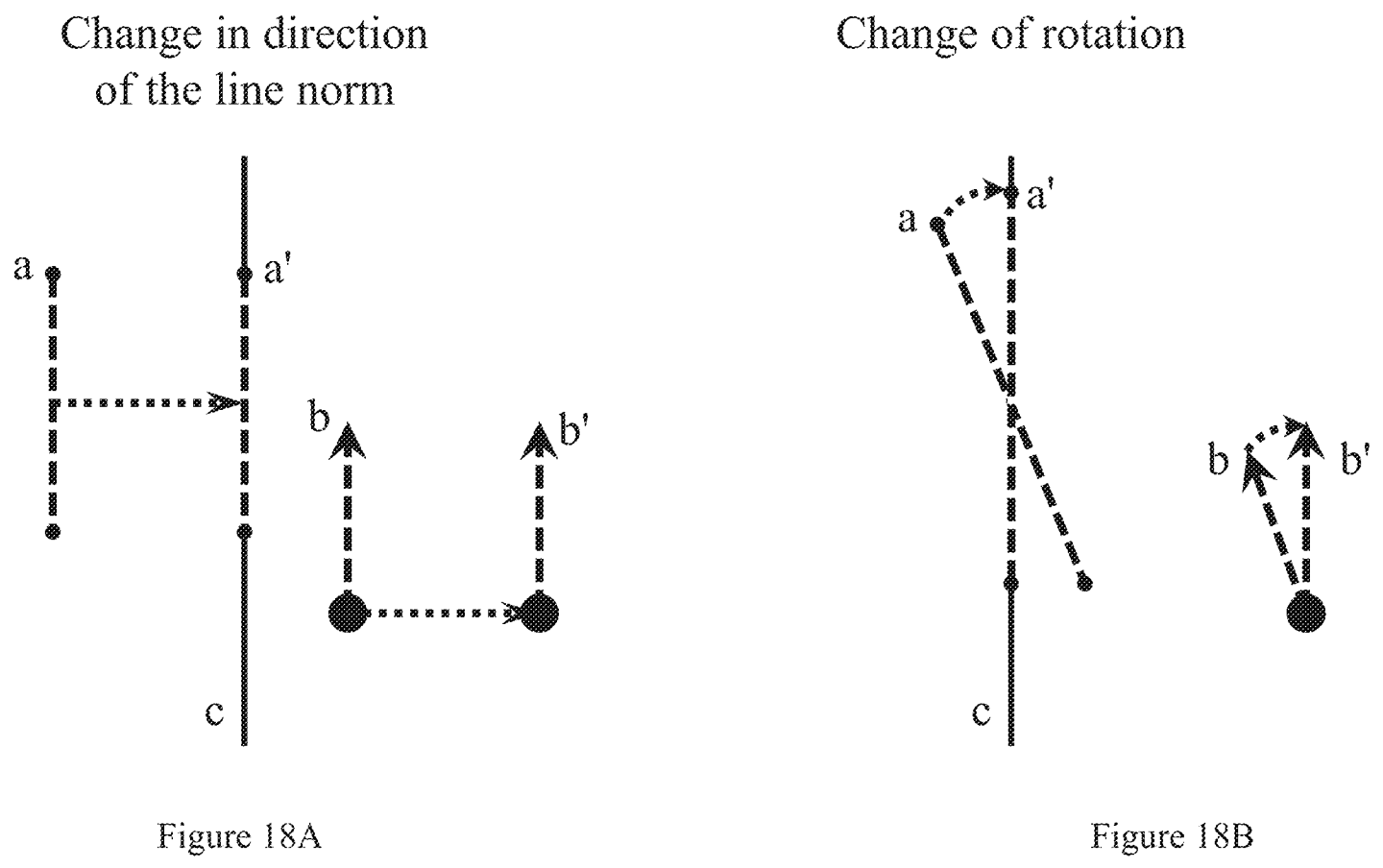

When grouting a line (FIG. 2.8), the grout line is always visible by one of the down-looking imaging sensors which can be leveraged to update the robots position and rotation. The LIDAR localization is within 5 cm of reality and rotation within 15 degrees. Parallel grout lines are typically at least 15 cm apart with different parallels being at least 45 degrees apart. For example tiling with the most common 30×30 cm square tiles has 30 cm parallel separation with 90 degrees between different parallels. Because of this, each grout gap seen from the down-looking imaging sensors matches to exactly one grout line in the map. This may be used update the position of the robot in the map in the direction of the norm to the gap and to update the rotation. FIG. 18A is a schematic illustration of updating a position of the autonomous grouting robotic apparatus and FIG. 18B is a schematic illustration of updating a rotation angle of the autonomous grouting robotic apparatus. The original robot position and angle b dashed arrow is updated by the seen line a' to a new precise position b' using the perceived grout line in map frame a and the grout line c in the map.

An embodiment of the control system and method was simulated and tested and the control system. Simulations indicate the system works for speeds of up to 260 mm/s speed. At the speed the system sees 5 images per direction, and therefore each gap needs to be seen in at least 10 frames. This system achieves sub-millimetre localization in the norm direction and rotation of the grouted gap (and achieves total sub-millimetre localization only when at least 2 non-parallel gaps are seen) which is all that is needed to do grouting with sub-millimetre precision. Averaging over the last 3 frames can be used to boost the localization using the same bucketing and clustering used before.

In one embodiment the line detection algorithm is Fast-LineDetector which operates at 20 fps on a Raspberry Pi processor, and the control system is implemented as a finite state machine and using a behaviour tree solution. The FastLineDetector is a less complex line detector than a Hough Transform based line detector and is implemented in OpenCV.

The performance was evaluated on by comparing video shot on the robot measured by hand on random frames. In this embodiment the imaging sensor 17a is camera mounted 7 cm above the ground with 720 p resolution at 15 frames per second. Results show on the minimal gap size of 0.8 mm and maximum gap size of 2 mm. Average distance from truth (LI loss) is under 1 mm on raw data and under 0.5 mm for 3 frame median for both sizes. Performance can be increased further with further tuning. Updating of the precise location is done continuously. Motion data and image data is collected concurrently. In one embodiment wheel control runs at 20 Hz while navigating the room and 100 Hz while grouting. Cameras are operated at a rate depending upon the processor and image size. In this embodiment using a Raspbery Pi process, images were collected at 10 Hz for images with 640p resolution, and at 30 Hz for images at 320p resolution. These rates were sufficient to provide or maintain sub-millimeter precision with the robot moving at a speed of around 1 cm per sec. Further odemetry data can be collected and used to interpolate the position of lines between frames (or to improve accuracy). In one embodiment the control system is a closed loop system in which the control system is provided the latest transformation of the grouting line to the robot and outputs an updated command for the wheels to ensure accurate tracing of the grouting line.

In one embodiment the front and down looking cameras 17a, 17b, 17c are between 7 to 10 cm above the tiles, although other distances may be used. In one embodiment the pointing directions of the cameras were 90° (forward) and 62° (downward). However other pointing directions may be used and will depend upon specific field of view of image sensors and the amount of overlap between forward and downward fields of view which will depend upon the specific imaging sensor and/or optical assembly. The calibration process or combining (e.g. averaging) of the images will compensate for specific choices and configurations. Other localization methods may be used such as a probabilistic system. This generates results that are comparable or better than the localization embodiment discussed above, but the simple norm direction and rotation update discussed above (based on using a FastLineDetector) has the advantage of achieving the required result at a lower computational complexity. This is thought to be due to the very small error of the computer vision pipeline for grout line detection in the down-looking cameras.

The control system may be implemented using one or more computing apparatus as described herein. The computing apparatus may comprise one or more processors including multi-core CPUs, Graphical Processing Units (GPUs), and Tensor Processing Units (TPUs) operatively connected to one or more memories which store instructions to configure the processor to perform embodiments of the method. In this context, the computing system may include, for example, one or more processors (CPUs, GPUs), memories, storage, and input/output devices (e.g., monitor, touch screen, keyboard, buttons, network interface/communications module, etc.). However, the computing apparatus may include circuitry or other specialized hardware for carrying out some or all aspects of the processes. The computing apparatus may be an all-in-one computer, an industrial computer (e.g. ruggedized), an Edge computer, a TPU board, a laptop, a tablet, a mobile computing apparatus, a microcontroller, a microprocessor board, and any associated peripheral devices. The computing apparatus may be a unitary computing or programmable device, or a distributed system or device comprising several components operatively (or functionally) connected via wired or wireless connections. In some operational settings, the computing system may be configured as a system that includes one or more devices, each of which is configured to carry out some aspects of the processes either in software, hardware, or some combination thereof. A user interface including a touch screen display or display and buttons may be provided to enable control or a user interface may be provided on another computing apparatus such as a mobile phone or a laptop which interfaces with a computing apparatus in the robot to allow a user to interact, monitor and configure the system. The user interface may be provided as an app or a web portal to allowing a user to remotely interact, monitor and configure the system. In some embodiments data processing may be performed remotely from the robot, for example by wirelessly exchanging data and results between a computing apparatus in the robot and a remote server which performs calculations (e.g. image processing or localisation and position updates). In one embodiment the one or more computing apparatus comprise a Raspberry Pi 4B 8GB computer with performs the main control method (including image/data processing, identification of grout lines, mapping and localisation tasks) with a an Arduino Nano to control a display/user interface for the robot, and an Arduino Due to directly control the various servo motors under instruction from the Raspberry Pi.

An embodiment of a computing apparatus comprises a central processing unit (CPU), a memory, and may include a GPU or TPU, an output device such as a display apparatus, and/or an input device such as touch screen, buttons, keyboard, etc. The display apparatus may be a touch screen which also acts as an input device. The computing device may comprise a single CPU (core) or multiple CPU's (multiple core), or multiple processors. The CPU may comprise an Input/Output Interface, an Arithmetic and Logic Unit (ALU) and a Control Unit and Program Counter element which is in communication with input and output devices (e.g. touch screen, LIDAR, imaging sensors/cameras, sensors) through the Input/Output Interface. The Input/Output Interface may comprise a network interface and/or communications module for communicating with an equivalent communications module in another device using a predefined communications protocol (e.g. Bluetooth, Zigbee, IEEE 802.15, IEEE 802.11, TCP/IP, UDP, etc). The memory is operatively coupled to the processor(s) and may comprise RAM and ROM components, and may be provided within or external to the device. The memory may be used to store the operating system and additional software modules or instructions. The processor(s) may be configured to load and executed the software modules or instructions stored in the memory.

A computer program may be written, for example, in a general-purpose programming language (e.g., Python, Java, C++, C, C#etc.), numeric computing environment such as MATLAB, or some specialized application-specific language, and may utilise or call software libraries or packages for example to implement data interfaces (e.g. JSON) or utilise machine learning (e.g. TensorFlow, CUDA).

In one embodiment Raspberry Pi4B 8 GB is used to control the robot using custom code written in Python and C++, and software libraries including:

ROS2—to handle communication between all libraries, sensors and custom code;

Nav2—ROS2 library for planning of path and driving the robot;

BehaviorCppV3—which executes the behaviour tree logic as shown in FIGS. 16A to 16E to call ROS2 actions Tensorflow2—to perform object detection on images;

Numpy—fast vectorized computation of numeric algorithms;

Scipy—trigonometry abstraction;

Docker—for containerisation of the software to allow the same tech-stack for development, simulation and operation in the robot.

In one embodiment the end to end work flow is as follows. The user places the robot on a ground in a room they wish to be grouted. By switching an ON/OFF button (on an external surface/user interface of the robot), the Raspberry Pi 4 is powered on. On OS startup, a Docker container containing the whole software is run. Upon the press of a Startup button all ROS2 nodes are started. One of the nodes is a Behaviour tree control node, which runs the control behaviour tree shown in FIGS. 16A to 16E. The user leaves the room for a few seconds (e.g. rooms under 12 metres in diameter) to a 1 minute whilst the robot maps the room using a SLAM algorithm (and operates the LIDAR). Following the logic defined in the behaviour trees (FIGS. 16A to 16E, with reference to FIGS. 17A, 17B, 18A and 18B), the robot first retrieves the room geometry 50 (i.e. mapping the room; FIG. 16B), then retrieves the grouting lines 60 (identifying the grout lines; FIG. 16C), and then grouts room 70 by grouting the lines 80 one by one (FIGS. 16D, FIG. 16E). The behaviour tree ends, leaving the room grouted and then the robot shuts down.

Various modifications may be performed to the embodiments described above and illustrated in the various figures. For example in the embodiment shown in FIGS. 1A through 14E, the grout extruder mounting assembly 12 is mounted onto the front sponge guide assembly so that tilting the front sponge guide assembly also tilts the grout extruder mounting assembly (that is they tilt in tandem). This has the advantage of enabling a compact robot and simplifying the control system. However in another embodiment the grout extruder mounting assembly could be modified to be mounted directly to the front frame via a separate support assembly to allow it to move and tilt separately from the front sponge guide assembly.

In one embodiment the front support assembly and/or sponge belt cleaning and tensioning assembly may be further modified to allow easier access for replacing the sponge belt. The geometry of the sponge belt and rollers may also be adjusted to facilitate smoother movement of the sponge belt around the rollers. Tightening the belt may be performed whenever the belt changes position (e.g. raised, lowered or tilted) or the belt may be automatically or continuously tensioned (or loosened). A distance sensor could be added to both structures holding 5a and 12b to measure the extension of the threaded rods 12b to ensure the extruder and front sponge guide assembly are correctly tilted and orientated. The protruding slots (13k1 and 13k3) of the nozzle tip may be omitted. Various arrangements may be used to enable tilting of the grout extruder and forward tip of the belt, such as the use of rails with trapezoidal threaded rods and/or servos motor systems. The arc shape and locations of the guiding arc rollers 11*i* and 11*a* may be varied to optimise the control of the belt, and additional rollers may be added depending upon the size of the machine. When the sponge belt is tilting (or twisting) rollers 11*a* and 11*k* may twist/rotate by different angles in order to improve the guidance of the sponge belt better and to make sure that it does not go out of place and is sufficiently tensioned at that point. The tilt angle of the rollers can vary based on different situations and the tile angle can vary independently of the main pivot structure angle through parts 11*k*, 11*n*, and 11*m*. In this embodiment a single set of rollers is used however in other embodiment multiple cascades may be used to widen the range of tilt angles that may be used.

The position of the LIDAR may be moved (e.g. made higher) or a second LIDAR added to the front (near camera 17*a*) to prevent occlusions by the grout extruder. One or more imaging sensors may be added to the rear for quality control and may avoid the need to pass over a just grouted line a second time (and thus reduce grouting time). In one embodiment the grout line detection uses a FastLineDetector method. Optimisation/updated can be performed by running a wide hyperparameter search on a large and robust dataset as more data is collected from real world use, as well as widening the transformations applied to those images. An alternative grout localization snapping algorithm could be used such as a probabilistic-kinematic model could be used which takes into account the covariances of sensor readings as well as robots speed and acceleration. This generates results that are comparable or better than the localization embodiment discussed above, but the simple norm direction and rotation update method discussed above has the advantage of achieving the required result at a lower computational complexity. This is thought to be due to the very small error of the computer vision pipeline for grout line detection in the down-looking cameras. The robot can be equipped with a frontal camera with an object detection pipeline (or the images from the front camera passed through an object detection pipeline). The view would be used to detect any objects in the room not covered by the plane of the 2D Lidar. Using trigonometry, the wall and ground pipes can be transformed into 3D space and baked into the map as no-go zones.

In some embodiments the control system could be provided a map of the room (e.g. from a computer model or manual measurements) and a navigation path. In this embodiment the mapping step comprises using the provided map as an initial (coarse) map for the SLAM algorithm, and the map is refined or verified by the LIDAR scans and motion data as the robot moves. In one embodiment mapping of the room can be performed to assist in the tiling of the room, and determining the tile layout. In this embodiment the robot can first map the (untiled) room to determine the room geometry (FIG. 16B and right hand side of 17B). This map can then be provided to a computer model (e.g. CAD system) and a tile lay plan constructed. This tile plan may take into account the capabilities of the robot (e.g. physical size) to determine where to create gaps. The map and tiling plan can then be provided to the robot as an initial map for the grouting process. In one embodiment the grout cartridge 13*j* could be replaced with a marker cartridge containing a viscous dye which can be extruded from the nozzle 13*k* by the plunger arrangement, or a marker such as a chalk or pen marker attached to the nozzle 13*k*. The robot is then driven around the room and used to mark edges, corners, centre points, or other reference points of tiles to be placed to assist tilers in subsequent placement of tiles. After marking the tile layout, the marker cartridge is replaced with a grout cartridge, or the marker is removed to allow grouting of the gaps (after laying of the tiles). In this embodiment the control system is configured to map the room (or verify/refine a map of the room) and is provided with a tiling plan prior to marking the tiling locations. The control system is also configured to determine the precise location and orientation of the robot (and thus the nozzle/marker tip) as it moves around the room, and to determine when to place a mark according to the tiling plan. In one embodiment, the robot is configured to determine the tiling plan after mapping the room and to then mark out the tile plan. In this embodiment a user may specify some design criteria, such as tile size, tile separation distance or range, a starting point (eg. a specific corner to minimise cutting or a center point), one or more axis of symmetry, a minimum tile size for any cut tiles. The robot then uses the design criteria to create the tiling plan, which may be optionally reviewed and confirmed by the user, the robot then draws out the tile plan on site autonomously. Alternatively a separate tile marking robot based on the present robot may be used in which the grout cleaning arrangement and grout extruder are omitted and replaced with a marker support assembly which supports a marker having a marker tip, and the marker support assembly is configured to control a location and a height of the marker tip and to control a tilt angle of the marker tip with respect to a vertical axis of the autonomous tile marking robotic apparatus. This may be based on the grout extruder and grout cleaning arrangement and associated supporting components. In this embodiment the control system is configured to map the room and mark out a pre-generated tile plan provided to the robot, or to generate and mark the tiling plan as discussed above. As described above the control system is configured to determine the precise location and orientation of the marker tip (and when to lower the marker and draw a mark) as the robot moves around the room according to the tiling plan. If a marker location is an edge marker location the marker support assembly is tilted by a tilt angle to direct a tip of the marker over the edge marker location. The control system may also be configured to generate the tiling plan as discussed above.

Embodiments may be used for grouting tiles on a floor by filling in the gaps in between tiles after the tiles have been laid and set. The robot may be used with various types of grout, such as cementitious (sanded, unsanded, fine sanded), polymer, epoxy, or combined grouts. Embodiments of the robotic apparatus may also be used for grouting in paving, or even to fill up grout in any form of gaps (i.e. not just tile grouts), including wall tiles, tiles on surfaces that are not parallel to the ground, and other forms of floor coverings such as marble gum grout.

As discussed above previous attempts to develop tools and apparatus have been of limited usefulness, as they are generally only useful for specific tasks such as cleaning a sponge, or operating in large open areas away from boundaries. Embodiments of the autonomous grouting robotic apparatus overcome numerous issues and provide several advantages, or at least provide a more useful alternative, to such systems. Notably the development of a mechanism and associated control system to allow tilting of the front sponge guide assembly and the grout extruder allows embodiments to be used to grout and clean edges and corners (rather than just central areas). Any previous mechanisms or apparatuses are also not autonomous or limited autonomy (such as a simple spiral movement algorithm) and thus require human intervention or control. In contrast, embodiments of the present robot implement open ended navigation and grout line detection, and thus the robot is able to navigate autonomously in arbitrary (e.g. regular, irregular or odd-shaped) spaces and start the grouting process without needing the user to upload any information beforehand. Thus with a single press of a start button the robot will autonomously grout an entire room (or a given space) including the edges.

Embodiments of the apparatus are configured to allow grouting into corners and edges by tilting the grout extruder and belt. The nozzle is also specifically configured to enable this. As shown in FIG. 7B the nozzle may be chamfered such that it is no more than 90 degrees wide (e.g. 70 degrees for the tip 13k2), that is no more than 45 degrees on each side when it is in the central position, in the direction of motion, such that it can be placed on each side or the robot and ensure that the tip of the nozzle is at the edge at the junction between the wall and the tiles adjacent to the wall such that it can grout edges effectively. Thus, the nozzle tip would be the corner most location of the robot in the direction of travel, so that other components of the robot do not hinder the movement of the robot while it is trying to grout the corner grout lines. In some embodiments a "pointier" nozzle could be used. The contact region between the nozzle (13k6) and the ground is level, and is configured to be level when twisted to the sides, and that the tip of the nozzle has to be the front most part of the robot so as to ensure that grout can be dispensed to the end of the grout line to ensure complete grouting. Part 13k4 also shows that the front face of the nozzle should be more than 90 degrees counterclockwise away from the plane where the grout is being extruded (which would be parallel to 13k6). This is so that the nozzle tip is able to reach the end of a given grout line flushed to the wall without having anything else in the way (see FIG. 7D). This is further illustrated in FIGS. 2A to 2B where the nozzle tip is the front most object of the whole robot.

The grouting extruder and front sponge guide assembly are placed on a system of rails (4d and 4e) and an axis (6g1) to allow it to twist by at least 45 degrees on each side away from the central position so as to cover corners. The height of the nozzle tip and sponge belt, and can be controlled by a linear actuator or equivalent (12d and 6a respectively). This enables the nozzle to be extended when it is grouting the corners (FIG. 2A) and retracted when it is grouting the centre (FIG. 1a) in order for the nozzle to be level on the ground. The nozzle can be retracted when not in use so that the robot can move about freely with some clearance. The rotation about the axis 6g1 and marked (+) in FIG. 8B6 pointing towards the front of the robot can be achieved with a sideways trapezoidal threaded rod (4d) with a stepper motor, or a servo motor attached to the axis of rotation, or a timing belt, or other equivalent means.

The front sponge guide assembly 5 can also be raised and lowered to assist in cleaning. Thus after the sponge belt from the cleaning mechanism reaches the wall and runs for some time, the whole cleaning mechanism can be lifted up together with the contact region of the sponge belt as seen in FIG. 3D. This ensures that if there is any bit of grout that was pushed against the wall (and thus dirtying it), the cleaning mechanism would be able to clean that up.

Further a sponge belt cleaning and tensioning assembly is configured to enable tilting (or twisting) of the belt to clean grout in edges and corners. As shown in FIGS. 10A to 10E an arc shaped roller 11i is used to help guide the exiting sponge belt to the centre of the roller, given that the sponge belt mechanism can be twisted and thus can approach from any direction. This is also because the wedge belt is not on the side of the sponge that is facing the roller at 11i and thus an arc shape is beneficial to help with additional guidance. Through a series of such rollers, the sponge belt can be reliably guided to the centre of the rollers and can thus enter the water tank in an orderly fashion, where it would be squeezed and filled up with cleaner water. When the belt exits the sponge belt cleaning and tensioning assembly a series of arced rollers may be used to help to guide the sponge belt to the correct intended angle and the cycle repeats. In addition to the arc shaped rollers, a wedge (timing or cogged) belt can be used to drive the sponge belt 7 and further guide it to its intended location. This may assist in reducing the chances of the sponge belt mechanically being dislodged from its intended path. This would work hand in hand with additional grooves in the middle of all rollers corresponding to the wedge belt used to ensure that the sponge belt is in the right position.

Additionally the control system has been developed to recognise grout lines (tile gaps) in a range of lighting conditions, determine a precise location with sub-mm precision and then autonomously drive the robot to deliver and clean grout. Further this can be performed in a room with any geometry including irregular and non-well defined spaces, rather than just in the centre of a room or by requiring a user to predetermine a path or upload a room geometry.

The control system is configured to robustly detect the gaps between tiles (grout lines) enabling it to work in most lighting conditions and with any tiles including on wooden floors. This is in contrast to systems that attempt to detect the edges of the tiles which perform poorly in different lighting conditions or with differently coloured tiles. In particular an embodiment was tested in a construction site with a range of hue, contrast and brightness proving the system works in most light conditions. Further embodiments use computationally simple and efficient implementations to enable use on low power industrial processors. For example in one embodiment the line detection algorithm is FastLineDetector which operates at 20 fps on a Raspberry Pi processor, and the control system is implemented as a finite state machine and using behaviour tree solution.

Those of skill in the art would understand that information and signals may be represented using any of a variety of technologies and techniques. For example, data, instructions, commands, information, signals, bits, symbols, and chips may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software or instructions, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. Software modules, also known as computer programs, computer codes, or instructions, may contain a number a number of source code or object code segments or instructions, and may reside in any computer readable medium such as a RAM memory, flash memory, ROM memory, EPROM memory, registers, hard disk, a removable disk, a CD-ROM, a DVD-ROM, a Blu-ray disc, or any other form of computer readable medium. In some aspects the computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media. In another aspect, the computer readable medium may be integral to the processor. The processor and the computer readable medium may reside in an ASIC or related device. The software codes may be stored in a memory unit and the processor may be configured to execute them. The memory unit may be implemented within the processor or external to the processor, in which case it can be communicatively coupled to the processor via various means as is known in the art.

Further, it should be appreciated that modules and/or other appropriate means for performing the methods and techniques described herein can be downloaded and/or otherwise obtained by a computing device in the apparatus. For example, such a computing device can be coupled to a server (via wired or wireless means) to facilitate the transfer of means for performing the methods described herein. Alternatively, various methods described herein can be provided via storage means (e.g., RAM, ROM, a physical storage medium such as a USB or flash disc etc.), such that a computing device can obtain the various methods upon coupling or providing the storage means to the device. Moreover, any other suitable technique for providing the methods and techniques described herein to a device can be utilized.

In one form the invention may comprise a computer program product for performing the method or operations presented herein. For example, such a computer program product may comprise a computer (or processor) readable medium having instructions stored (and/or encoded) thereon, the instructions being executable by one or more processors to perform the operations described herein. For certain aspects, the computer program product may include packaging material.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, the terms "analysing", "determining" and "estimating" encompasses a wide variety of actions. For example, these terms may include calculating, computing, processing, deriving, investigating, selecting, choosing, looking up (e.g., looking up in a table, a database or another data structure), accessing (e.g., accessing data in a memory), ascertaining, receiving (e.g., receiving information) and the like.

The reference to any prior art in this specification is not, and should not be taken as, an acknowledgement or any form of suggestion that such prior art forms part of the common general knowledge.

It will be understood that the terms "comprise" and "include" and any of their derivatives (e.g. comprises, comprising, includes, including) as used in this specification, and the claims that follow, is to be taken to be inclusive of features to which the term refers, and is not meant to exclude the presence of any additional features unless otherwise stated or implied.

In some cases, a single embodiment may, for succinctness and/or to assist in understanding the scope of the disclosure, combine multiple features. It is to be understood that in such a case, these multiple features may be provided separately (in separate embodiments), or in any other suitable combination. Alternatively, where separate features are described in separate embodiments, these separate features may be combined into a single embodiment unless otherwise stated or implied. This also applies to the claims which can be recombined in any combination. That is a claim may be amended to include a feature defined in any other claim. Further a phrase referring to "at least one of" a list of items refers to any combination of those items, including single members. As an example, "at least one of: a, b, or c" is intended to cover: a, b, c, a-b, a-c, b-c, and a-b-c.

It will be appreciated by those skilled in the art that the disclosure is not restricted in its use to the particular application or applications described. Neither is the present disclosure restricted in its preferred embodiment with regard to the particular elements and/or features described or depicted herein. It will be appreciated that the disclosure is not limited to the embodiment or embodiments disclosed, but is capable of numerous rearrangements, modifications and substitutions without departing from the scope as set forth and defined by the following claims.

The invention claimed is:

1. An autonomous grouting robotic apparatus comprising:
a frame;
a grout cleaning arrangement comprising:
    a sponge belt forming a loop;
    a tank;
    a sponge belt cleaning and tensioning assembly comprising a plurality of rollers;
    a front sponge guide assembly configured to guide the sponge belt over a forward tip; and
    a front support assembly mounted to the frame and which is configured to support the front sponge guide assembly and to control a height of the front sponge guide assembly and a tilt angle of the front sponge guide assembly with respect to a vertical axis of the autonomous grouting robotic apparatus;
a grout extruder comprising a grout extruder mounting assembly which either supports a grout storage container or is configured to receive and support a removable grout storage container, and a motorised plunger, wherein the grout storage container (13) or the removable grout storage container (13) ends in a nozzle with a slot and is configured to receive the motorised plunger, and the grout extruder mounting assembly is configured to control a location and a height of the nozzle and to control a tilt angle of the nozzle with respect to the vertical axis of the autonomous grouting robotic apparatus;
a power system configured to provide power to the autonomous grouting robotic apparatus;

a drive system configured to drive the autonomous grouting robotic apparatus;

a control system comprising at least one processor, at least one memory, at least one LIDAR, at least one imaging sensor, and at least one motion sensor, wherein the at least one imaging sensor is mounted to the frame to observe a composite field of view in front of the autonomous grouting robotic apparatus, and the at least one motion sensor is configured to detect motion of the autonomous grouting robotic apparatus, and the control system is configured to process at least a plurality of images and a plurality of LIDAR scans to map a room and identify a plurality of grouting lines where each grouting line corresponds to a gap between tiles, and to control the drive system, the grout extruder and the grout cleaning arrangement to control extrusion of grout from the nozzle and to clean excess grout off tiles, such that when extruding grout the slot is aligned along the grouting line.

2. The autonomous grouting robotic apparatus as claimed in claim 1, wherein the slot of the nozzle ends in a nozzle tip, and when viewed from the side, a front face of the nozzle is inclined rearward with respect to the nozzle tip and the vertical axis such that an angle from the grouting line to the front face is greater than 90 degrees, and when viewed from the front the nozzle has a symmetrical chamfered profile such that a left side and a right side each define an opening angle with the vertical axis of less than 45 degrees.

3. The autonomous grouting robotic apparatus as claimed in claim 2, wherein the slot comprises a plurality of gaps each separated by projection separator that protrudes out of the slot to compress grout into the tile gap.

4. The autonomous grouting robotic apparatus as claimed in claim 1, wherein the grout extruder mounting assembly is mounted on the front sponge guide assembly such that tilting the front sponge guide assembly also tilts the grout extruder mounting assembly and wherein the grout storage container is a grout cartridge and the grout extruder mounting assembly comprises a lower mount and an upper mount, wherein the lower mount has an inverted U shaped profile such that when mounted to the front sponge guide assembly the arms of the U define a gap through which the belt passes, and the upper mount is configured to support the grout cartridge and comprises a pair of guide rails which extend rearward of the upper mount and are connected to an end cap which supports the motorised plunger arrangement, and a linear actuator arrangement is configured to control extension and retraction of the grout cartridge along the guide rails to control a location of the nozzle tip with respect to a front face of the upper mount, and wherein the upper mount is configured to be driven away from the lower mount so as to control an orientation of the nozzle tip as the front sponge guide assembly is tilted.

5. The autonomous grouting robotic apparatus as claimed in claim 4, wherein the front sponge guide assembly comprises a main support structure on which the grout extruder mounting assembly is mounted, and a plurality of rollers that defines a forward belt path around the main support structure comprising a first front powered roller to receive and drive the belt, a tip roller located distal of the front powered roller with a smaller diameter than the front powered roller to define the forward tip and guide the belt over and then under the front powered roller and towards a rear guide roller for guiding the belt back towards the sponge belt cleaning and tensioning assembly.

6. The autonomous grouting robotic apparatus as claimed in claim 5, wherein the frame comprises a body frame and a front frame extending forward of the body frame, and the front support assembly comprises a first support structure mounted to the front frame which supports a pivot arrangement and a second support structure which supports the front sponge guide assembly, wherein a height of the second support structure is adjustable with respect to the first support structure, and the pivot arrangement comprises a front pivoting mount that supports a front pivoting roller and a rear roller wherein the front pivoting roller guides the sponge belt coming from the sponge belt cleaning and tensioning assembly towards the front powered roller and the rear roller receives the sponge belt from the rear guide roller and direct the belt to the sponge belt cleaning and tensioning assembly, and the front sponge guide assembly is connected to the front pivoting mount, and tilting of the front sponge guide assembly is driven by the second support structure which causes pivoting of the front pivoting mount and front pivoting roller and wherein the rear roller is a pivoting roller which is independently pivotable with respect to the front pivoting roller such that a pivot angle of the rear roller may be different to a pivot angle of the front pivoting roller.

7. The autonomous grouting robotic apparatus as claimed in claim 6, further comprising a set of cascading pivoting rollers, wherein each roller in the set of cascading pivoting rollers is pivotable such that a total pivot angle or a pivoting range of the cascading pivoting rollers is larger than a pivot angle or a pivoting range of each individual pivoting roller, and either the set of pivoting rollers comprises the front pivoting roller and one or more additional pivoting rollers, or the set of pivoting rollers comprises the rear roller and one or more additional pivoting rollers and the rear roller is also a pivoting roller that is independently pivotable with respect to the front pivoting roller such that a pivot angle of the rear roller may be different to a pivot angle of the front pivoting roller, or the set of pivoting rollers comprises two sets of pivoting rollers, the first set comprising the front pivoting roller and one or more additional pivoting rollers and the second set of pivoting rollers comprises the rear roller and one or more additional pivoting rollers and the rear roller is also a pivoting roller that is independently pivotable with respect to the front pivoting roller such that a pivot angle of the rear roller may be different to a pivot angle of the front pivoting roller.

8. The autonomous grouting robotic apparatus as claimed in claim 6, wherein the second support structure comprises a left frame and a right frame, and one or more guide rails that extend between the left and right frames and pass through apertures in the main support structure of the front sponge guide assembly and a threaded rod extends between the left and right frames and passes through a threaded nut in a horizontal slide arrangement in the main support structure of the front sponge guide assembly and one or both of the left and right frames comprises a motor arrangement to drive rotation of the threaded rod which drives the threaded nut along the threaded rod such that the horizontal slide arrangement translates horizontal movement into a rotation and tilting of the front sponge guide assembly, and a plurality of guide rods and one or more threaded rods connect the first support structure to the second support structure and one or more motors drive rotation of the threaded rods to adjust the height of the first support structure with respect to the second support structure.

9. The autonomous grouting robotic apparatus as claimed in claim 1, wherein the frame comprises a body frame and a front frame extending forward of the body frame and the at least one imaging sensor comprises at least two imaging sensors which observe a composite field of view wherein at least one sensor is mounted to a distal end of the front frame in a forward direction and at least one imaging sensor is mounted to the distal end of the front frame in a downward direction.

10. The autonomous grouting robotic apparatus as claimed in claim 1, wherein the plurality of rollers direct the sponge belt through a serpentine path within the cleaning and tensioning assembly and the plurality of rollers comprises a plurality of squeezing rollers, a plurality of rinsing rollers, a plurality of powered drive rollers and a plurality of tensioning rollers, wherein at least two of the plurality of squeezing rollers are located in the tank and receive the sponge belt from the front support assembly and are configured to squeeze grout out of the sponge belt and direct the sponge belt towards the plurality of rinsing rollers which are located in the tank, and at least one of the tensioning rollers directs the sponge belt out from the sponge belt cleaning and tensioning assembly towards the front pivoting roller and each of the tensioning rollers are mounted to a motor configured to adjust a position of the tensioning roller to control a tension in the sponge belt.

11. The autonomous grouting robotic apparatus as claimed in claim 1, wherein the control system is configured to:

map a room and identify the plurality of grout lines within the room by driving the autonomous grouting robotic apparatus around the room and collecting the plurality of images, the plurality of LIDAR scans, and motion data from the at least one motion sensor, and using a simultaneous localization and mapping (SLAM) algorithm to process the plurality of LIDAR scans and motion data to generate a map of the room, and processing the plurality of images to identify the plurality of grouting lines corresponding to gaps between tiles in the room wherein the at least one motion sensor comprises one or more odometry sensors configured to monitor rotation of one or more wheels of the autonomous grouting robotic apparatus and wherein identification of grout lines is performed after mapping the room using the SLAM algorithm; and grout a room by progressively selecting each grouting line in the map until all grouting lines are selected and grouted and for each selected grouting line:

drive the autonomous grouting robotic apparatus to a starting location;

dispense grout into the grouting line from the grout extruder mounted on the autonomous grouting robotic apparatus by controlling the location of the nozzle of the grout extruder and driving the autonomous grouting robotic apparatus to follow the grouting line wherein a precise location and a rotation angle are continuously updated using motion data from the at least one motion sensors and a plurality of images from the at least one image sensors captured as the autonomous grouting robotic apparatus moves; and retrace the grouting line and cleaning excess grout from the grouting line using the sponge belt guided by a front sponge guide assembly mounted on the autonomous grouting robotic apparatus, wherein if the grout line is an edge grout line, the grout extruder and the front sponge guide assembly are tilted by a tilt angle to direct the nozzle and belt over the edge grout line.

12. The autonomous grouting robotic apparatus as claimed in claim 11, wherein when identifying the plurality of grouting lines and when updating the precise location and the rotation angle, the plurality of images are processed by a computer vision method to identify a plurality of lines, and the plurality of lines are then split by angle into a plurality of buckets where each bucket is of a pre-determined angular range and for each bucket, an average direction of the lines in the bucket is determined, and the middle of each line is projected on a norm of an average direction of the bucket to obtain a projected point, and the lines are clustered by the projected points where each cluster corresponds to a single real grouting line whose direction and center is set to the median direction and center of the lines in the cluster.

13. The autonomous grouting robotic apparatus as claimed in claim 12, wherein the pre-determined angular range bucket is 15 degrees.

14. The autonomous grouting robotic apparatus as claimed in claim 11, further comprising a marker, wherein the marker is adapted to be mounted to the nozzle, the grout storage container or the removable grout storage container, or the grout extruder is configured to receive a removable marker cartridge comprising a marker, and the control system is further configured to mark out a tiling map using the marker based on a tiling plan stored by the at least one memory.

15. The autonomous grouting robotic apparatus as claimed in claim 14, wherein the control system is configured to generate the tiling plan after generating a map of the room according to one or more design criteria.

16. A method of controlling an autonomous grouting robotic apparatus comprising:

mapping a room and identifying a plurality of grout lines within the room by driving an autonomous grouting robotic apparatus around the room and collecting a plurality of images from at least one imaging sensor mounted on the autonomous grouting robotic apparatus, a plurality of LIDAR scans from at least one LIDAR mounted on the autonomous grouting robotic apparatus, and motion data from at least one motion sensor configured to detect motion of the autonomous grouting robotic apparatus, and using a simultaneous localization and mapping (SLAM) algorithm to process the plurality of images, plurality of LIDAR scans and motion data to generate a map of the room, and processing the plurality of images to identify a plurality of grouting lines corresponding to gaps between tiles in the room;

grouting a room by progressively selecting each grouting line in the map until all grouting lines are selected and grouted and for each selected grouting line:

driving the autonomous grouting robotic apparatus to a starting location;

dispensing grout into the grouting line from a grout extruder mounted on the autonomous grouting robotic apparatus by controlling a location of a nozzle of the grout extruder and driving the autonomous grouting robotic apparatus to follow the grouting line wherein a precise location and rotation angle are continuously updated using motion data from the at least one motion sensors and a plurality of images from the at least one imaging sensors captured as the autonomous grouting robotic apparatus moves;

retracing the grouting line and cleaning excess grout from the grouting line using a sponge belt guided by a front sponge guide assembly mounted on the autonomous grouting robotic apparatus, wherein if a grout line is an edge grout line, the grout extruder and the front sponge guide assembly are tilted by a tilt angle to direct the nozzle and belt over the edge grout line.

17. The method as claimed in claim 16, wherein the motion sensors comprise one or more odometry sensors configured to monitor rotation of one or more wheels of the autonomous grouting robotic apparatus.

18. The method as claimed in claim 16, wherein identification of grout lines is performed after mapping the room using the SLAM algorithm.

19. The method as claimed in claim 16, wherein when identifying the plurality of grouting lines and when updating the precise location and the rotation angle, the plurality of images are processed by a computer vision method to identify a plurality of lines, and the plurality of lines are then split by angle into a plurality of buckets where each bucket is of a pre-determined angular range and for each bucket, an average direction of the lines in the bucket is determined, and the middle of each line is projected on a norm of an average direction of the bucket to obtain a projected point, and the lines are clustered by the projected points where each cluster corresponds to a single real grouting line whose direction and center is set to the median direction and center of the lines in the cluster, wherein the pre-determined angular range bucket is 15 degrees and the method further comprises generating a tiling plan after generating a map of the room according to one or more design criteria.

20. A computer readable medium comprising instructions for causing a processor to implement the method of claim 16.

\* \* \* \* \*